US012469500B2

(12) United States Patent
Bai et al.

(10) Patent No.: US 12,469,500 B2
(45) Date of Patent: Nov. 11, 2025

(54) METHODS, APPARATUS AND SYSTEMS FOR DUAL-ENDED MEDIA INTELLIGENCE

(71) Applicants: DOLBY LABORATORIES LICENSING CORPORATION, San Francisco, CA (US); DOLBY INTERNATIONAL AB, Amsterdam Zuidoost (NL)

(72) Inventors: Yanning Bai, Beijing (CN); Mark William Gerrard, Rozelle (AU); Richard Han, Beijing (CN); Martin Wolters, Nuremberg (DE)

(73) Assignees: Dolby Laboratories Licensing Corporation, San Francisco, CA (US); Dolby International AB, Dublin (IE)

( * ) Notice: Subject to any disclaimer, the term of this patent is extended or adjusted under 35 U.S.C. 154(b) by 170 days.

(21) Appl. No.: 17/312,011

(22) PCT Filed: Dec. 10, 2019

(86) PCT No.: PCT/US2019/065338
§ 371 (c)(1),
(2) Date: Jun. 9, 2021

(87) PCT Pub. No.: WO2020/123424
PCT Pub. Date: Jun. 18, 2020

(65) Prior Publication Data
US 2022/0059102 A1    Feb. 24, 2022

Related U.S. Application Data

(60) Provisional application No. 62/792,997, filed on Jan. 16, 2019.

(30) Foreign Application Priority Data

Feb. 14, 2019  (EP) ..................... 19157080

(51) Int. Cl.
*G10L 19/008*     (2013.01)
*G06F 16/65*      (2019.01)
(Continued)

(52) U.S. Cl.
CPC ............ *G10L 19/008* (2013.01); *G06F 16/65* (2019.01); *G06F 16/68* (2019.01); *G10L 19/167* (2013.01)

(58) Field of Classification Search
CPC ..... G10L 19/008; G10L 19/167; G10L 19/16; G10L 19/26; G10L 19/20; G10L 19/22;
(Continued)

(56) References Cited

U.S. PATENT DOCUMENTS 6,877,134 B1    4/2005  Fuller
7,243,111 B2    7/2007  Nesvadba
(Continued)

FOREIGN PATENT DOCUMENTS

CN    102687198 B    9/2014
CN    104240709 B    10/2019
(Continued)

OTHER PUBLICATIONS

Xu, Y. et al "Fully DNN-based Multi-Label Regression for Audio Tagging" Jun. 24, 2016, 5 pages.

*Primary Examiner* — Leshui Zhang

(57) ABSTRACT

A method of encoding audio content comprises performing a content analysis of the audio content, generating classification information indicative of a content type of the audio content based on the content analysis, encoding the audio content and the classification information in a bitstream, and outputting the bitstream. A method of decoding audio content from a bitstream including audio content and classification information for the audio content, wherein the classification information is indicative of a content classification
(Continued)

of the audio content, comprises receiving the bitstream, decoding the audio content and the classification information, and selecting, based on the classification information, a post processing mode for performing post processing of the decoded audio content. Selecting the post processing mode can involve calculating one or more control weights for post processing of the decoded audio content based on the classification information.

17 Claims, 15 Drawing Sheets

(51) Int. Cl.
  *G06F 16/68* (2019.01)
  *G10L 19/16* (2013.01)
(58) Field of Classification Search
  CPC ... G10L 19/002; G10L 19/018; G10L 19/012; G10L 19/005; G10L 25/51; G10L 25/81; G10L 21/02; G10L 21/0316; G10L 21/0364; G10L 19/02; G10L 19/00; G10L 19/04; G10L 21/038; G10L 25/30; G10L 25/18; G10L 19/0204; G10L 19/173; G10L 19/18; G10L 2025/783; G10L 25/00; G10L 25/03; G10L 15/18; G10L 15/20; G10L 19/0018; G10L 19/087; G06F 16/65; G06F 16/68; G06F 3/165; G06F 3/162; G10H 1/0008; G10H 1/00; H04N 19/107; H04S 3/008; H04S 3/00; H04S 2420/03; H04S 5/00; H04S 7/30; H04S 2400/01; H04S 2400/11; H04S 2400/15; H04S 1/007; H04S 3/002; H04S 3/006; H04S 3/02; H04S 1/00; H04S 2420/01; H04S 7/302; H03M 7/30; H03M 7/3006; H03M 7/40; H03M 7/42
  USPC ......... 704/224, 225, 500–504; 381/1–23, 61, 381/63, 309, 310, 311, 104–108, 109, 381/110; 700/94
  See application file for complete search history.

(56) References Cited

U.S. PATENT DOCUMENTS

| | | | |
|---|---|---|---|
| 7,403,224 | B2 | 7/2008 | Fuller |
| 7,640,272 | B2 | 12/2009 | Mahajan |
| 8,121,198 | B2 | 2/2012 | Thambiratnam |
| 8,903,186 | B2 | 12/2014 | Lerios |
| 9,609,452 | B2 | 3/2017 | Peters |
| 2004/0044525 | A1* | 3/2004 | Vinton ............... H03G 5/165 704/224 |
| 2008/0208589 | A1 | 8/2008 | Cross |
| 2010/0138890 | A1 | 6/2010 | Seupel |
| 2011/0238425 | A1* | 9/2011 | Neuendorf ........... G10L 19/008 704/500 |
| 2012/0084089 | A1 | 4/2012 | Lloyd |
| 2014/0056430 | A1* | 2/2014 | Choi .................. H04S 5/00 381/17 |
| 2014/0294200 | A1 | 10/2014 | Baumgarte |
| 2015/0088508 | A1 | 3/2015 | Bharadwaj |
| 2016/0049915 | A1* | 2/2016 | Wang .................. G10L 21/0364 381/107 |
| 2016/0134881 | A1 | 5/2016 | Wang |
| 2016/0322060 | A1* | 11/2016 | Riedmiller ........... G10L 19/018 |
| 2016/0353139 | A1 | 12/2016 | Smith |
| 2017/0032793 | A1 | 2/2017 | Baumgarte |
| 2017/0032801 | A1 | 2/2017 | Baumgarte |
| 2017/0243596 | A1 | 8/2017 | Eggerding |
| 2018/0068666 | A1 | 3/2018 | Riedmiller |
| 2018/0182394 | A1 | 6/2018 | Hulaud |

FOREIGN PATENT DOCUMENTS

| | | |
|---|---|---|
| EP | 3079257 | 10/2016 |
| JP | 2007306114 A | 11/2007 |
| JP | 2010-508545 | 3/2010 |
| JP | 2014132439 A | 7/2014 |
| JP | 2016507088 A | 3/2016 |
| JP | 2016509249 A | 3/2016 |
| JP | 2018141854 A | 9/2018 |
| RU | 2639663 C2 | 12/2017 |
| WO | 2010003521 | 1/2010 |

* cited by examiner

METHODS, APPARATUS AND SYSTEMS FOR DUAL-ENDED MEDIA INTELLIGENCE

TECHNICAL FIELD

The present disclosure relates to methods of encoding audio content into a bitstream and to methods of decoding the audio content from the bitstream. The present disclosure particularly relates to such methods in which classification information indicative of a content type of the audio content is transmitted in the bitstream.

BACKGROUND

The perceived benefits of audio signal post processing can be improved when the audio signal processing algorithms are aware of the content that is being processed. For example, a dialogue enhancer's accurate detection of dialogue is improved when there is a measured high confidence of dialogue in the current audio frame. Also, a virtualizer may be disabled in the presence of music content to preserve the musical timbre, or a dynamic equalizer designed to timbre match music (such as the Dolby® Volume Intelligent Equalizer) may be disabled in the presence of dialogue in a movie to preserve the timbre of speech.

Typically users may be required to switch profiles, such as "movie" or "music" to get the best settings on their playback device but this often requires accessing advanced settings or UIs which many users may be unaware of or uncomfortable with.

An approach to address this issue would be to use a content analysis tool (such as, e.g., Dolby's Media Intelligence) to detect features in the audio signal to determine how likely certain content types are in the audio stream.

A current playback device, such as a mobile phone that can play back a variety of content including movies and music, may use a content analysis tool (such as, e.g., Dolby's Media Intelligence) to determine confidence values for the presence of certain content types in the audio stream. The content analysis tool may return confidence values (confidence scores) on the presence of "music", "speech" or "background effects". The confidence values can then be used in combinations to return algorithm steering weights, which in turn may be used to control (e.g., the strength of) certain post processing features.

The method described above is a "single ended" solution which could be performed within a decoder or within a separate post processing library which takes in PCM audio data. This single ended implementation can be effective at steering post processing algorithms, but adds significant computational complexity to the playback device and thus the real time nature of the content analysis can be limited to the affordable capabilities on the playback device.

Thus, there is a need for improved methods and devices for content-aware processing of audio content.

SUMMARY

The present disclosure provides methods of encoding audio content and methods of decoding audio content, having the features of the respective independent claims.

One aspect of the disclosure relates to a method of encoding audio content. The method may include performing a content analysis of the audio content. The content analysis may be performed by applying Dolby's Media Intelligence tool, for example. Also, the content analysis may be performed for each of a plurality of consecutive windows, each window including a predetermined number of consecutive (audio) frames. At this, the content analysis may be based on one or more calculations of likelihood/confidence based on determinable features within the audio content. These calculations may be dynamic and can be adjusted to amplify or de-amplify a specific likelihood. In more general terms, the content analysis may be adaptive and/or may have been trained beforehand using predetermined audio content. The content analysis may use a look-ahead buffer to reduce latency. In addition or as an alternative, an encoding latency may be introduced to accommodate for the processing time required for the content analysis. Also, the content analysis may be performed in multiple passes. The method may further include generating classification information indicative of a content type of the audio content based on (a result of) the content analysis. Generating the classification information may also be based on a detection of scene transitions in the audio content (or a manual indication of scene transition). For example, a change rate of confidence values included in the classification information may be greater if a scene transition is detected/indicated (i.e., greater than in the steady state). The method may further include encoding the audio content and the classification information, e.g., the confidence values, into a bitstream. The encoded audio content and the encoded classification information may be multiplexed. The method may yet further include outputting the bitstream.

In the context of this disclosure 'content type' of the audio content means content type that can be played back in a playback device and that can be distinguished by a human ear by one or more audio characteristics of the content type. For example, music can be distinguished from speech or noise because involves a different audio frequency bandwidth, a different power distribution of the audio signal over different frequencies, a different tonal duration, different type and number of fundamental and dominant frequencies, etc.

By performing the content analysis at the encoder-side and encoding the resulting classification information into the bitstream, a computational burden on the decoder can be significantly relaxed. Additionally, the encoder's superior computational capabilities can be used to perform a more complex and more accurate content analysis. Apart from catering to the encoder's and the decoder's different computational capabilities, the proposed method provides the decoder-side with additional flexibility in audio post processing of decoded audio. For example, the post processing may be customized in accordance with a device type of a device implementing the decoder and/or a user's personal preferences.

In some embodiments, the content analysis may be based at least in part on metadata for the audio content. Thereby, additional control over the content analysis, for example by a content creator, is provided for. At the same time, accuracy of the content analysis can be improved by providing appropriate metadata.

Another aspect of the disclosure relates to a further method of encoding audio content. The method may include receiving a user input relating to a content type of the audio content. The user input may include manual labels or manual confidence values, for example. The method may further include generating classification information indicative of the content type of the audio content based on the user input. The method may further include encoding the audio content and the classification information into a bitstream. For example, the labels or the confidence values may be encoded in the bitstream. The method may yet further include outputting the bitstream. By this method additional control over the content analysis, for example by a content creator, is provided for.

In some embodiments, the user input may include one or more of a label indicating the audio content to be of a given content type, and one or more confidence values, each confidence value being associated with a respective content type and giving an indication of a likelihood that the audio content is of the respective content type. Thereby, a user of the encoder can be given additional control over the post processing that is performed at the decoder-side. This enables, for example, ensuring that a content creator's artistic intent is preserved by the post processing.

Another aspect of the disclosure relates to a further method of encoding audio content. The audio content may be provided in a stream of audio content as part of an audio program. The method may include receiving a service type indication that indicates a service type (e.g., audio program type) of the audio content. The service type may be a music service or a news (newscast) service/channel, for example. The method may further include performing a content analysis of the audio content based at least in part on the service type indication. The method may further include generating classification information indicative of a content type of the audio content based on (a result of) the content analysis. Confidence values, as examples of the classification information, may also be directly provided by the content creator, together with the audio content. Whether or not confidence values etc. provided, e.g., by the content creator are taken into account may depend on the service type indication. The method may further include encoding the audio content and the classification information into a bitstream. The method may yet further include outputting the bitstream.

By taking into account the service type indication, the encoder can be aided in performing the content analysis. Moreover, a user at the encoder-side can be given additional control over the decoder-side audio post processing, which enables, for example, ensuring that a content creator's artistic intent is preserved by the post processing.

In some embodiments, the method may further include determining, based on the service type indication, whether the service type of the audio content is a music service. The method may yet further include, in response to the determination that the service type of the audio content is a music service, generating the classification information to indicate that the content type of the audio content is music content (content type "music"). This may amount to setting the confidence value for content type "music" to the highest possible value (e.g., 1), while setting any other confidence values to zero.

In some embodiments, the method may further include determining, based on the service type indication, whether the service type of the audio content is a newscast service. The method may yet further include, in response to the determination that the service type of the audio content is a newscast service, adapting the content analysis to have a higher likelihood to indicate the audio content to be speech content. This may be achieved by adapting one or more calculations (calculation algorithms) of the content analysis to increase the likelihood/confidence for speech content (content type "speech") in the result of the content analysis and/or by adapting the one or more calculations of the content analysis to decrease the likelihoods/confidences for content types other than speech content.

In some embodiments, the service type indication may be provided on a frame-by-frame basis.

Another aspect of the disclosure relates to a further method of encoding audio content. The audio content may be provided on a file basis. The method may be performed on a file basis. The files may include metadata for their respective audio content. The metadata may include markers, labels, tags, etc. The method may include performing a content analysis of the audio content based at least in part on the metadata for the audio content. The method may further include generating classification information indicative of a content type of the audio content based on (a result of) the content analysis. The method may further include encoding the audio content and the classification information into a bitstream. The method may yet further include outputting the bitstream.

By taking into account the file metadata, the encoder can be aided in performing the content analysis. Moreover, a user at the encoder-side can be given additional control over the decoder-side audio post processing, which enables, for example, ensuring that a content creator's artistic intent is preserved by the post processing.

In some embodiments, the metadata may include a file content type indication that indicates a file content type of the file. The file content type may be a music file (file content type "music file"), a newscast file/clip (file content type "newscast file"), or a file including dynamic (non-static, or mixed-source) content (such as, for example a musical genre of movie that transitions frequently, e.g., once every few minutes, between spoken scenes and musical/song scenes; file content type "dynamic content"). The file content type may be the same (uniform) for the whole file or may change between portions of the file. Then, the content analysis may be based at least in part on the file content type indication.

In some embodiments, the method may further include determining, based on the file content type indication, whether the file content type of the file is a music file. The method may yet further include, in response to the determination that the file content type of the file is a music file, generating the classification information to indicate that the content type of the audio content is music content.

In some embodiments, the method may further include determining, based on the file content type indication, whether the file content type of the file is a newscast file. The method may yet further include, in response to the determination that the file content type of the file is a newscast file, adapting the content analysis to have a higher likelihood to indicate the audio content to be speech content. This may be achieved by adapting one or more calculations (calculation algorithms) of the content analysis to increase a likelihood/confidence for speech content in the content analysis and/or by adapting the one or more calculations to decrease likelihoods/confidences for content types other than speech content.

In some embodiments, the method may further include determining, based on the file content type indication, whether the file content type of the file is dynamic content. The method may yet further include, in response to the determination that the file content type of the file is dynamic content, adapting the content analysis to allow for a higher transition rate between different content types. For example, the content type may be allowed to transition more frequently between content types, for example between music and non-music (i.e., more frequently than for the steady state). Moreover, smoothing of the classification information (time smoothing) may be disabled for dynamic content (i.e., dynamic file content).

In some embodiments, in the method according to any of the above aspects or embodiments, the classification information may include one or more confidence values. Each confidence value may be associated with a respective content type and may give an indication of a likelihood that the audio content is of the respective content type.

In some embodiments, in the method according to any of the above aspects or embodiments, the content types may include one or more of music content, speech content, or effects (e.g., background effects) content. The content types may further include crowd noise/cheering.

In some embodiments, the method according to any of the above aspects or embodiments may further include encoding an indication of scene transitions in the audio content into the bitstream. The indication of scene transitions may include one or more scene reset flags, each indicating a respective scene transition. The scene transitions may be detected at the encoder or may be externally provided, e.g., by a content creator. In the former case, the method would include a step of detecting scene transitions in the audio content, and in the latter case, a step of receiving a (manual) indication of scene transitions in the audio content. By indicating the scene transitions in the bitstream, audible artifacts at the decoder-side that could result from inappropriate post processing across scene transitions can be avoided.

In some embodiments, the method according to any of the above aspects or embodiments may further include smoothing (time smoothing) of the classification information before encoding. For example, the confidence values may be smoothed over time. The smoothing may be disabled depending on circumstances, for example at scene transitions, for audio content flagged as dynamic (non-static), in accordance with control input/metadata, etc. By smoothing the classification information, stability/continuity of the decoder-side audio post processing can be improved.

In some embodiments, the method according to any of the above aspects or embodiments may further include quantizing the classification information before encoding. For example, the confidence values may be quantized. Thereby, a bandwidth required for transmitting the classification information in the bitstream can be reduced.

In some embodiments, the method according to any of the above aspects or embodiments may further include encoding the classification information into a specific data field in a packet of the bitstream. The bitstream may be an AC-4 (Dolby® AC-4) bitstream, for example. The specific data field may be a Media Intelligence (MI) data field. The MI data field may include any, some, or all of the following fields: b_mi_data_present, music_confidence, speech_confidence, effects_confidence, b_prog_switch, b_more_mi_data_present, more_mi_data.

Another aspect of the disclosure relates to a method of decoding audio content from a bitstream including audio content and classification information for the audio content. The classification information may be indicative of a content classification of the audio content. The content classification may be based on a content analysis and optionally on a user input relating to a content type of the audio content (where both the content analysis and the user providing the input are performed at the encoder), for example. The method may include receiving the bitstream. The method may further include decoding the audio content and the classification information. The method may yet further include selecting, based on the classification information, a post processing mode for performing post processing of the decoded audio content. In other words, the decoding method may select a post processing of the decoded audio content based on the classification information.

Providing the decoder with the classification information allows the decoder to forego content analysis, which significantly relaxes the computational burden on the decoder. Moreover, additional flexibility is given to the decoder, which can decide on a suitable post processing mode based on the classification information. In doing so, additional information such as a device type and a user's preferences can be taken into account.

In some embodiments, the decoding method may further include calculating one or more control weights for the post processing of the decoded audio content based on the classification information.

In some embodiments, the selecting of the post-processing mode may be further based on a user input.

In some embodiments, the audio content is channel-based. For example, the audio content may be a two or more channels audio content. The post processing of the decoded audio content may comprise upmixing the channel-based audio content to an upmixed channel-based audio content. For example, a two-channel based audio content may be upmixed to a 5.1-channel, 7.1-channel or 9.1-channel audio content. The method may further comprise applying a virtualizer to the upmixed channel-based audio content to obtain a virtualized upmixed channel-based audio content for virtualization for a speaker array of a desired number of channels. For example, virtualization may provide an upmixed 5.1-channel, 7.1-channel or 9.1-channel audio content, to a two-channel speaker array, for example a headphone. However, virtualization may also provide an upmixed 5.1-channel audio content to a two-channel or 5.1-channel speaker array, an upmixed 7.1-channel audio content to a two-channel, 5.1 or 7.1-channel speaker array and an upmixed 9.1-channel audio content to a two-channel, 5.1, 7.1, or 9.1-channel speaker array.

In some embodiments, the method may further comprise calculating one or more control weights for the post processing of the decoded audio content based on the classification information.

In some embodiments, the classification information (encoded in the bitstream received by the decoder) may comprise one or more confidence values, each confidence value being associated with a respective content type and giving an indication of a likelihood that the audio content is of the respective content type. The control weights may be calculated based on the confidence values.

In some embodiments, the method may further comprise routing an output of the virtualizer to the speaker array, and calculating respective control weights for the upmixer and the virtualizer based on the classification information.

In some embodiments, the method may further comprise after applying the virtualizer, applying a cross fader to the channel-based audio content and the virtualized upmixed audio content and routing an output of the cross-fader to the speaker array. In this embodiment, the method may further comprise calculating respective control weights for the upmixer and the cross-fader based on the classification information.

In some embodiments, the control weights may be for controlling modules other than the upmixer, cross-fader or virtualizer. Similarly, several alternative methods of calculating the control weights are possible. The embodiments related to the number and types of control weights and methods of calculating thereof, are described herewith below in connection with the following other aspect of the disclosure. However, these embodiments are not limited to the following aspect of the disclosure but can be applied to any method of decoding audio content disclosed in the present document.

Another aspect of the disclosure relates to a further method of decoding audio content from a bitstream including audio content and classification information for the audio content. The classification information may be indicative of a content classification of the audio content. The method may include receiving the bitstream. The method may further include decoding the audio content and the classification information. The method may yet further include calculating one or more control weights for post processing of the decoded audio content based on the classification information. The control weights may be control weights for post processing algorithms/modules and may be referred to as algorithm steering weights. The control weights may control the strength of respective post processing algorithms.

In some embodiments, the classification information may include one or more confidence values, each confidence value being associated with a respective content type and giving an indication of a likelihood that the audio content is of the respective content type. The control weights may be calculated based on the confidence values.

In some embodiments, the control weights may be control weights for respective modules (algorithms) for post processing of the decoded audio content. The modules (algorithms) for post processing may include, for example, one or more of: an (intelligent/dynamic) equalizer, an (adaptive) virtualizer, a surround processing module, a dialogue enhancer, an upmixer, and a cross-fader.

In some embodiments, the control weights may include one or more of a control weight for an equalizer, a control weight for a virtualizer, a control weight for a surround processor, a control weight for a dialogue enhancer, a control weight for an upmixer, and a control weight for a cross-fader. The equalizer may be an intelligent equalizer, IEQ, for example. The virtualizer may be an adaptive virtualizer, for example.

In some embodiments, the calculation of the control weights may depend on a device type of a device that performs the decoding. In other words, the calculation may be end-point specific, or personalized. For example, the decoder-side may implement a set of end-point specific processes/modules/algorithms for post processing, and parameters (control weights) for these processes/modules/algorithms may be determined based on the confidence values in an end-point specific manner. Thereby, the specific capabilities of respective devices can be factored in when performing the audio post processing. For example, different post processing can be applied by a mobile device and a soundbar device.

In some embodiments, the calculation of the control weights may be further based on a user input. The user input may override or partially override the confidence-value-based calculation. For example, virtualization may be applied to speech if desired by user, or stereo widening, upmixing, and/or virtualization may be applied for a PC user, if desired by the user.

In some embodiments, the calculation of the control weights may be further based on a number of channels of the audio content. Also, the calculation of the control weights may be further based on one or more bitstream parameters (e.g., parameters carried by the bitstream and extractable from the bitstream).

In some embodiments, the method may include performing a content analysis of the audio content to determine on or more additional confidence values (e.g., for content types that have not been taken into account by the encoder-side). This content analysis may proceed in the same manner as described above with respect to the encoder-side. Then, the calculation of the control weights may be further based on the one or more additional confidence values.

In some embodiments, the control weights may include a control weight for a virtualizer. The control weight for the virtualizer may be calculated such that the virtualizer is disabled if the classification information indicates that the content type of the audio content is music or likely to be music. This may be the case for example if the confidence value for music is above a given threshold. Thereby, musical timbre can be preserved.

In some embodiments, the control weight for the virtualizer may be calculated such that the coefficients of the virtualizer scale between pass through and full virtualization. For example, the control weight for the virtualizer may be calculated as $1-\text{music\_confidence}*\{1-\max[\text{effects\_confidence},\text{speech\_confidence}]^2\}$. In some embodiments, the control weight for the virtualizer may further depend on (e.g., be determined based on) a number of channels in the audio content (i.e., a channel count) or other bitstream parameter(s). For example, the control weight (weighting factor) for virtualization may only be determined based on the confidence values for stereo content, and a fixed control weight (e.g., equal to 1) may be applied to all multi-channel content other than stereo content (i.e., for a number of channels in excess of 2).

In some embodiments, the control weights may include a control weight for a dialogue enhancer. The control weight for the dialogue enhancer may be calculated such that dialogue enhancement by the dialogue enhancer is enabled/enhanced if the classification information indicates that the content type of the audio content is speech or likely to be speech. This may be the case for example if the confidence value for speech is above a given threshold. Thereby, dialogue enhancement can be restricted to sections of the audio content that actually profit from it, while at the same time conserving computational power.

In some embodiments, the control weights may include a control weight for a dynamic equalizer. The control weight for the dynamic equalizer may be calculated such that the dynamic equalizer is disabled if the classification information indicates that the content type of the audio content is speech or likely to be speech. This may be the case for example if the confidence value for speech is above a given threshold. Thereby, unwanted alteration of timbre of speech can be avoided.

In some embodiments, the method may further include smoothing (time smoothing) of the control weights. The smoothing may be disabled depending on circumstances, for example at scene transitions, for audio content flagged as dynamic (non-static), in accordance with control input/metadata, etc. Smoothing of the control weights can improve stability/continuity of the audio post processing.

In some embodiments, the smoothing of the control weights may depend on the particular control weight that is smoothed. That is, the smoothing may be different between at least two control weights. For example, there may be no or just little smoothing for the dialogue enhancer control weight and/or stronger smoothing for the virtualizer control weight.

In some embodiments, the smoothing of the control weights may depend on a device type of a device that performs the decoding. For example, there may be different smoothing of the virtualizer control weight between a mobile phone and a TV set.

In some embodiments, the method may further include applying a non-linear mapping function to the control weights to increase continuity (e.g., stability) of the control weights. This may involve applying a mapping function to the control weights that maps values close to the boundaries of the domain range of the control weights closer to the boundaries of the image range, such as a sigmoid function, for example). Thereby, stability/continuity of the audio post processing can be further improved.

Another aspect of the disclosure relates to a method of decoding audio content from a bitstream including two-channel audio content and classification information for the two-channel audio content. The bitstream may be an AC-4 bitstream, for example. The classification information may be indicative of a content classification of the two-channel audio content. The method may include receiving the bitstream. The method may further include decoding the two-channel audio content and the classification information. The method may further include upmixing the two-channel audio content to upmixed 5.1-channel audio content. The method may further include applying a virtualizer to the upmixed 5.1-channel audio content for 5.1 virtualization for a two-channel speaker array. The method may further include applying a cross-fader to the two-channel audio content and the virtualized upmixed 5.1-channel audio content. The method may yet further include routing an output of the cross-fader to the two-channel speaker array. At this, the method may include calculating respective control weights for the virtualizer and/or the cross-fader based on the classification information. The virtualizer and the cross-fader may operate under control of their respective control weights.

Another aspect of the disclosure relates to a further method of decoding audio content from a bitstream including two-channel audio content and classification information for the two-channel audio content. The bitstream may be an AC-4 bitstream, for example. The classification information may be indicative of a content classification of the two-channel audio content. The method may include receiving the bitstream. The method may further include decoding the two-channel audio content and the classification information. The method may further include applying an upmixer to the two-channel audio content for upmixing the two-channel audio content to upmixed 5.1-channel audio content. The method may further include applying a virtualizer to the upmixed 5.1-channel audio content for 5.1 virtualization for a five-channel speaker array. The method may yet further include routing an output of the virtualizer to the five-channel speaker array. At this, the method may include calculating respective control weights for the upmixer and/or the virtualizer based on the classification information. The upmixer and the virtualizer may operate under control of their respective control weights. The control weight for the upmixer may relate to an upmix weight.

Another aspect relates to an apparatus (e.g., encoder or decoder) including a processor coupled to a memory storing instructions for the processor. The processor may be adapted to perform the methods according to the any of the above aspects and their embodiments.

Further aspects relate to computer programs including instructions for causing a processor that carries out the instructions to perform the methods according to any of the above aspects and their embodiments, and to respective computer-readable storage media storing these computer programs.

BRIEF DESCRIPTION OF THE DRAWINGS

Example embodiments of the disclosure are explained below with reference to the accompanying drawings, wherein like reference numbers indicate like or similar elements, and wherein FIG. 1 schematically illustrates an example of an encoder-decoder system according to embodiments of the disclosure, FIG. 2 schematically illustrates an example of a bitstream to which embodiments of the disclosure can be applied, FIG. 3 schematically illustrates an example of a data field for storing classification information of audio content according to embodiments of the disclosure, FIG. 4 schematically illustrates, in flow-chart form, an example of a method of encoding audio content according to embodiments of the disclosure, FIG. 5 schematically illustrates an example of content analysis of audio content according to embodiments of the disclosure, FIG. 6 schematically illustrates, in flow-chart form, another example of a method of encoding audio content according to embodiments of the disclosure, FIG. 7 schematically illustrates, in flow-chart form, another example of a method of encoding audio content according to embodiments of the disclosure, FIG. 8 schematically illustrates another example of content analysis of audio content according to embodiments of the disclosure, FIG. 9 schematically illustrates, in flow-chart form, yet another example of a method of encoding audio content according to embodiments of the disclosure, FIG. 10 schematically illustrates yet another example of content analysis of audio content according to embodiments of the disclosure, FIG. 11 schematically illustrates, in flow-chart form, an example of a method of decoding audio content according to embodiments of the disclosure, FIG. 12 schematically illustrates, in flow-chart form, another example of a method of decoding audio content according to embodiments of the disclosure, FIG. 13 schematically illustrates an example of control weight calculation according to embodiments of the disclosure, FIG. 14 schematically illustrates, in flow-chart form, another example of a method of decoding audio content according to embodiments of the disclosure, FIG. 15 schematically illustrates an example of the use of control weights in a decoder according to embodiments of the disclosure, FIG. 16 schematically illustrates, in flow-chart form, yet another example of a method of decoding audio content according to embodiments of the disclosure, and FIG. 17 schematically illustrates another example of the use of control weights in a decoder according to embodiments of the disclosure.

DETAILED DESCRIPTION

As indicated above, identical or like reference numbers in the disclosure indicate identical or like elements, and repeated description thereof may be omitted for reasons of conciseness.

Broadly speaking, the present disclosure proposes a transfer of content analysis from the audio decoder to the audio encoder, thereby creating a dual-ended approach to audio post processing. That is, at least a part of the content analysis module is moved from the decoder to the encoder and the audio stream (bitstream) is updated to carry the classification information (e.g., confidence values, confidence labels, or confidence scores) as generated by the (part of the) content analysis module in the encoder. The weight calculation is left to the decoder where it operates based on the classification information received with the audio stream.

Figure 1:
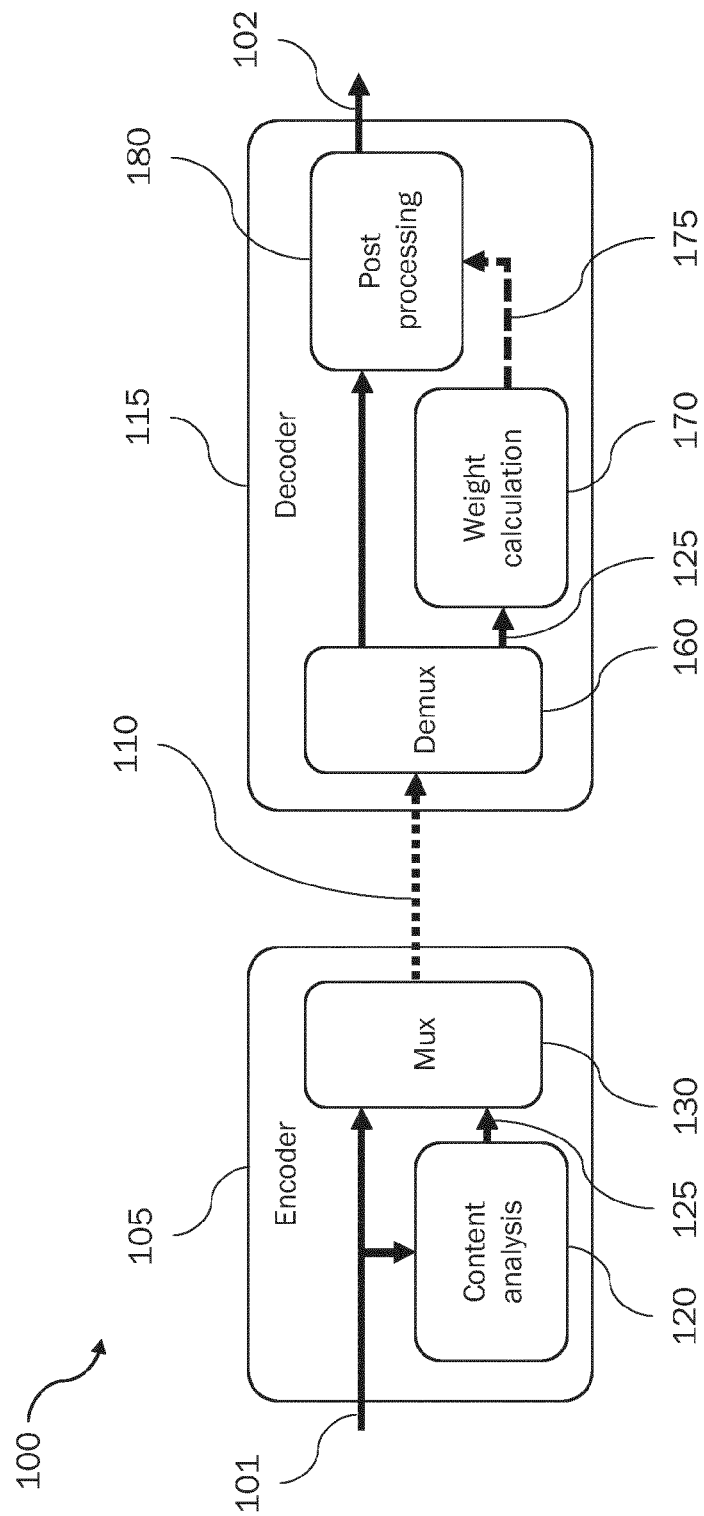

An example of an encoder-decoder system 100 implementing the above scheme is illustrated in block diagram form in FIG. 1. The encoder-decoder system 100 comprises an (audio) encoder 105 and an (audio) decoder 115. It is understood that the modules of the encoder 105 and decoder 115 described below may be implemented by respective processors of respective computing devices, for example.

The encoder 105 comprises a content analysis module 120 and a multiplexer 130. Thus, as noted above, content analysis is now part of the encoder stage. The encoder 105 receives input audio content 101 that is to be encoded, possibly in conjunction with associated metadata and/or user input. The input audio content 101 is provided to the content analysis module 120 and to the multiplexer 130. The content analysis module 120 performs content analysis of the audio content 101 (e.g., by applying Dolby's Media Intelligence tool) and derives classification information 125 for the audio content. The classification information 125 is indicative of a content type of the input audio content 101, as inferred by the content analysis. As will be described in more detail below, the classification information 125 can include one or more confidence values relating to respective content types (e.g., "music", "speech", and "background effect" confidence values). In some embodiments, the confidence values may have higher granularity than that. For example, the classification information 125 can include confidence values for one or more genres of music (such as, e.g., confidence values for content types "classical music," "rock/pop music," "acoustic music," "electronic music," etc.), instead of or in addition to a confidence value for content type "music." In some embodiments, the content analysis may be further based on metadata for the audio content and/or on user input (e.g., control input from a content creator).

The multiplexer 130 multiplexes the audio content and the classification information 125 into a bitstream 110. The audio content may be encoded in accordance with known audio coding methods, such as encoding according to the AC-4 coding standard, for example. In consequence, the audio content 101 and the classification information 125 may be said to be encoded into the bitstream 110, and the bitstream may be said to include the audio content and associated classification information for the audio content. The bitstream 110 then may be provided to the decoder 115.

In some implementations, the content analysis in the encoder 105 of the encoder-decoder system 100 may be performed for each of a plurality of consecutive windows, where each window includes a predetermined number of consecutive (audio) frames.

The content analysis may be based on one or more calculations of likelihood/confidence of respective content types based on determinable features within the audio content.

For example, the content analysis may include steps of pre-processing the audio content, feature extraction, and calculation of confidence values. The pre-processing, which may be optional, may include down mixing, re-framing, calculating an amplitude spectrum, etc. The feature extraction may extract/calculate a plurality of features (e.g., a few hundred features) from the audio content. These features may include any of Mel-Frequency Cepstral Coefficients (MFCCs), MFCC flux, zero crossing rate, chroma, auto-correlation, etc. The calculations that finally yield the confidence values may be performed by trained machine learning networks, for example.

The calculations performed in the context of content analysis (e.g., by the machine learning networks) may be variable/adaptive. If the calculations are variable, adjusting them will allow to derive the classification information in accordance with preferences for certain content types. For example, the (default) content analysis may return a confidence value of 0.7 for content type "music", a confidence value of 0.15 for content type "speech", and a confidence value of 0.15 for content type "effects" for a given piece of audio content (note that the confidence values in this example add up to one). If the content analysis is adapted to have some preference for content type "music" (i.e., if its calculations are adapted to this end), the adapted content analysis/calculations may yield, for example, a confidence value of 0.8 for content type "music", a confidence value of 0.1 for content type "speech", and a confidence value of 0.1 for content type "effects". Further non-limiting examples in which the calculations are adapted will be described below.

Moreover, the content analysis (e.g., the machine learning network(s)) may be adaptive and/or may have been trained beforehand using predetermined audio content. For example, in a dual ended system such as the encoder-decoder system 100, the content analysis can be further developed over time to improve the accuracy of the feature labelling. Advancements could come from increased complexity afforded through increased compute power on an encoding server and/or improvements in computer processor capabilities. The content analysis may also be improved over time through manual labelling of specific content type.

The encoder-side content analysis may use a look-ahead buffer or similar to reduce latency on the content type decision. This would address a known limitation in the single ended implementation, which requires a significantly large audio frame to make a strong decision. For example, an audio frame of 700 ms may be required to make a decision on dialogue presence, at which point the dialogue confidence score is 700 ms behind the onset of speech and the start of a spoken phrase may be missed. In addition or as an alternative, an encoding latency may be introduced to accommodate for the processing time required for the content analysis.

In some implementations, the content analysis may be performed in multiple passes to improve the accuracy of the content type decision.

In general, generating the classification information may also be based on detection of scene transitions in the audio content (or a manual indication of scene transition). To this end, the encoder 105 may comprise an additional reset detector for detecting such scene transitions/resets in the audio content. Manual labelling or additional reset scene detection may be used to influence the rate of change of the content analysis confidence values. For example, a change rate of confidence values included in the classification information may be greater if a scene transition is detected/indicated (i.e., greater than in the steady state). In other words, when an audio program changes, the confidence values may be allowed to adapt quicker than in the steady state of an audio program to ensure that audible transitions between post processing effects are minimized. In accordance with scene detection, an indication of scene transitions (e.g., one or more reset flags (scene transition flags), each indicating a respective scene transition) may be encoded/multiplexed into the bitstream 110 along with the classification information 125 (e.g., confidence values).

The decoder 115 in the encoder-decoder system 100 comprises a demultiplexer 160, a weight calculation module 170 and a post processing module 180. The bitstream 110 received by the decoder 115 is de-multiplexed in the demultiplexer 160 and the classification information 125 and the audio content, possibly after decoding in accordance with known audio decoding methods, such as decoding according to the AC-4 coding standard, for example, are extracted. In consequence, the audio content and the classification information 125 may be said to be decoded from the bitstream 110. The decoded audio content is provided to the post processing module 180 that performs post processing of the decoded audio content. To this end, the decoder 115 selects a post processing mode for the post processing module 180 based on the classification information 125 extracted from the bitstream 110. In more detail, the classification information 125 extracted from the bitstream 110 is provided to the weight calculation module 170, which calculates one or more control weights 175 for post processing of the decoded audio content based on the classification information 125. Each control weight may be a number between 0 and 1, for example, and may determine a strength of a respective process/module/algorithm for post processing. The one or more control weights 175 are provided to the post processing module 180. The post processing module 180 can select/apply a post processing mode in accordance with the control weights 175, for post processing the decoded audio content. Selecting the post processing mode may be further based on user input in some embodiments. Post processing of the decoded audio content by the post processing module 180, using the selected post processing mode, may yield an output audio signal 102 that is output by the decoder 115.

The calculated one or more control weights 175 may be control weights for post processing algorithms performed by the post processing module 180 and thus may also be referred to as algorithm steering weights. As such, the one or more control weights 175 can provide steering for post processing algorithms in the post processing module 180. In this sense, the control weights 175 may be control weights for respective (sub-)modules for post processing of the decoded audio content. For example, the post processing module 180 may comprise one or more respective (sub-) modules, such as an (intelligent/dynamic) equalizer, an (adaptive) virtualizer, a surround processor, a dialogue enhancer, an upmixer, and/or a cross-fader. The control weights 175 may be control weights for these (sub-) modules, which may operate under control of their respective control weights. Accordingly, the control weights 175 may include one or more of a control weight for an equalizer (such as an intelligent equalizer (IEQ), for example), a control weight for a virtualizer (such as an adaptive virtualizer, for example), a control weight for a surround processor, a control weight for a dialogue enhancer, a control weight for an upmixer, and/or a control weight for a cross-fader. Here, an intelligent equalizer is understood to adjust a plurality of frequency bands using a target spectral profile. A gain curve is adapted dependent on the audio content to which the intelligent equalizer is applied.

Determining the classification information 125 at the encoder 105 and providing it to the decoder 115 as part of the bitstream 110 can reduce the computational burden at the decoder 115. Moreover, taking advantage of the encoder's higher computational capacity, the content analysis can be made more powerful (e.g., more accurate).

Figure 2:
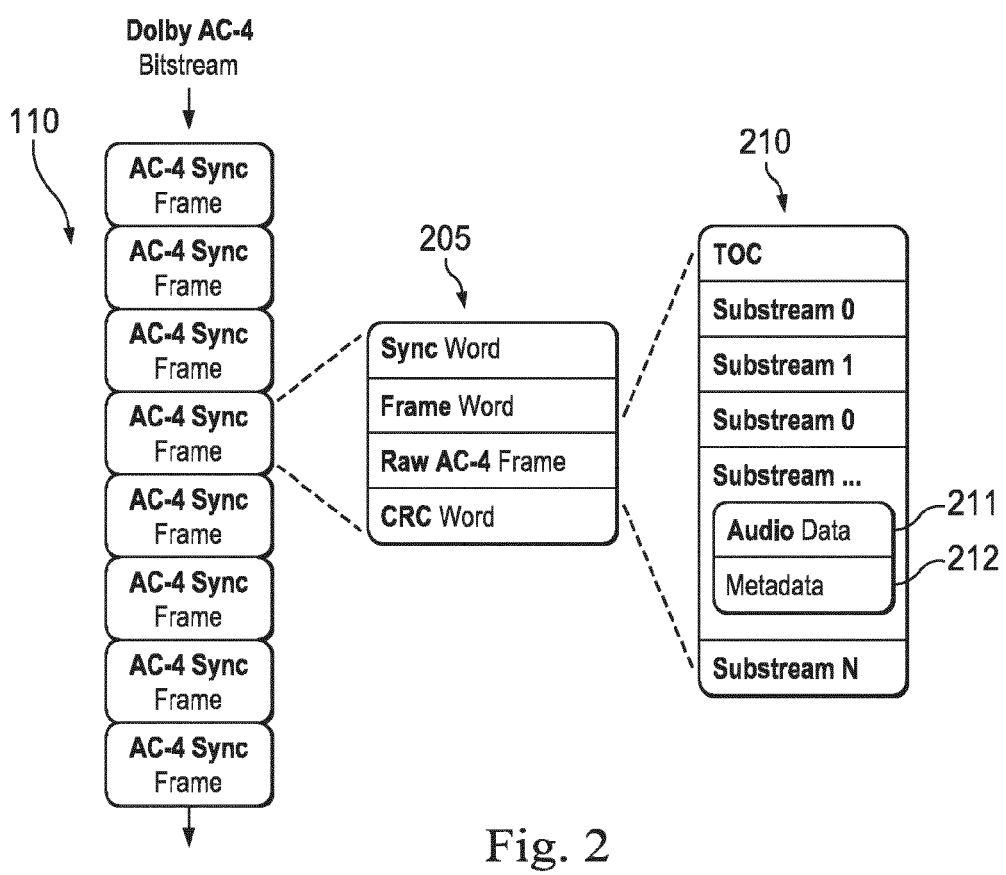

FIG. 2 schematically illustrates an AC-4 bitstream as an example implementation of the bitstream 110. The bitstream 110 comprises a plurality of frames (AC-4 frames) 205. Each frame 205 comprises a sync word, a frame word, a raw frame 210 (AC-4 frame), and a CRC word. The raw frame 210 comprises a table of contents (TOC) field and a plurality of substreams as indicated in the TOC field. Each substream includes an audio data field 211 and a metadata field 212. The audio data field 211 may include the encoded audio content and the metadata field 212 may include the classification information 125.

Figure 3:
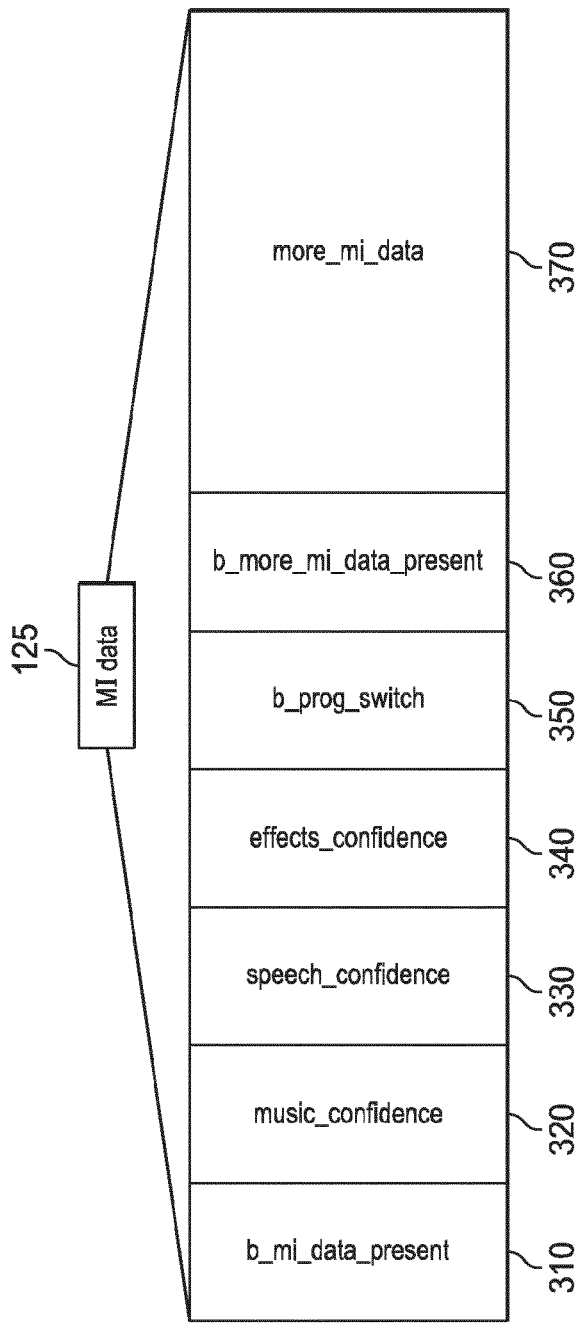

Given such bitstream structure, the classification information 125 may be encoded into a specific data field in a packet of the bitstream. FIG. 3 schematically illustrates an example of a data field in a (frame of a) bitstream for carrying the classification information 125. This data field may be referred to as a MI data field. The data field may comprise a plurality of sub-fields 310-370. For example, the data field may comprise any, some, or all of a b_mi_data_present field 310 that indicates whether classification information (media information, or Media Intelligence) is present in the frame, a music_confidence field 320 including the confidence value for content type "music", a speech_confidence field 330 including the confidence value for content type "speech", an effects_confidence field 340 including the confidence value for content type "effects", a b_prog_switch field 350, a b_more_mi_data_present field 360 that indicates whether more classification information (media information) is present, and a more_mi_data field 370 including more classification information (e.g., the confidence value for crowd noise). Since the classification information (e.g., the confidence values) are determined by a long-term analysis (content analysis), they may be changing comparatively slowly. Thus, the classification information may not be encoded for each packet/frame, but may be encoded into, for example, one out of N frames, with $N \geq 2$.

Alternatively, the classification information 125 (e.g., confidence values) may be encoded into a presentation substream of the AC-4 bitstream.

Moreover, for file-based audio content, the classification information 125 (e.g., confidence values) may not be encoded for each frame, but may be encoded into an appropriate data field of the bitstream to be valid for all frames in the file.

Figure 4:
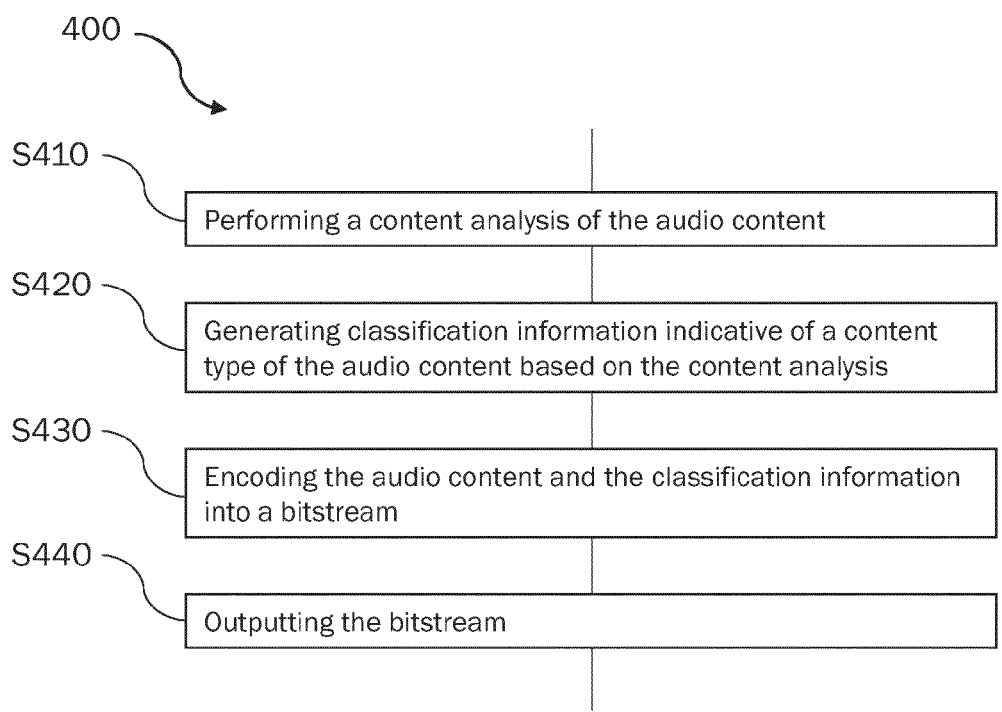

FIG. 4 is a flowchart that illustrates an example of a method 400 of encoding audio content. Method 400 may be performed by the encoder 105 in the encoder-decoder system 100 of FIG. 1, for example.

At step S410 a content analysis of the audio content is performed.

At step S420 classification information indicative of a content type of the audio content is generated based on (a result of) the content analysis.

At step S430 the audio content and the classification information are encoded into a bitstream.

Finally, at step S440 the bitstream is output.

Notably, the steps of method 400 may be performed in the manner discussed above for the encoder-decoder system 100.

As noted above, generating the classification information may be further based on a detection of scene transitions in the audio content (or a manual indication of scene transition). Accordingly, method 400 (or any of methods 600, 700, or 900 described below) may further comprise detecting scene transitions in the audio content (or receiving an input of manual indications of scene transitions in the audio content) and encoding an indication of the scene transitions in the audio content into the bitstream.

Details of the content analysis (e.g., the content analysis performed by the content analysis module 120 of the encoder 105 or the content analysis performed at step S410 of method 400) will be described next with reference to FIG. 5.

As mentioned above, the content analysis produces classification information 125 indicative of a content type of the audio content 101. In some embodiments of the disclosure, the classification information 125 comprises one or more confidence values (feature confidence values, confidence scores). Each of these confidence values is associated with a respective content type and gives an indication of a likelihood that the audio content is of the respective content type. These content types can include one or more of music content, speech content, and effects (e.g., background effects) content. In some implementations, the content types can further include crowd noise content (e.g., cheering). That is, the classification information 125 can include one or more of a music confidence value indicating a confidence (likelihood) that the audio content is of content type "music", a speech confidence value indicating a confidence (likelihood) that the audio content 101 is of content type "speech", and an effects confidence value indicating a confidence (likelihood) that the audio content 101 is of content type "effects", as well as possibly a crowd noise confidence value indicating a confidence (likelihood) that the audio content 101 is of content type "crowd noise".

In the following, it will be assumed that the confidence values are normalized to fall into the range from 0 to 1, where 0 indicates zero likelihood (0%) that the audio content is of the respective content type and 1 indicates certainty (full likelihood, 100%) that the audio content is of the respective likelihood. It is understood that the value "0" is a non-limiting example for a value of the confidence value that indicates zero likelihood and that the value "1" is a non-limiting example for a value of the confidence value that indicates full likelihood.

Figure 5:
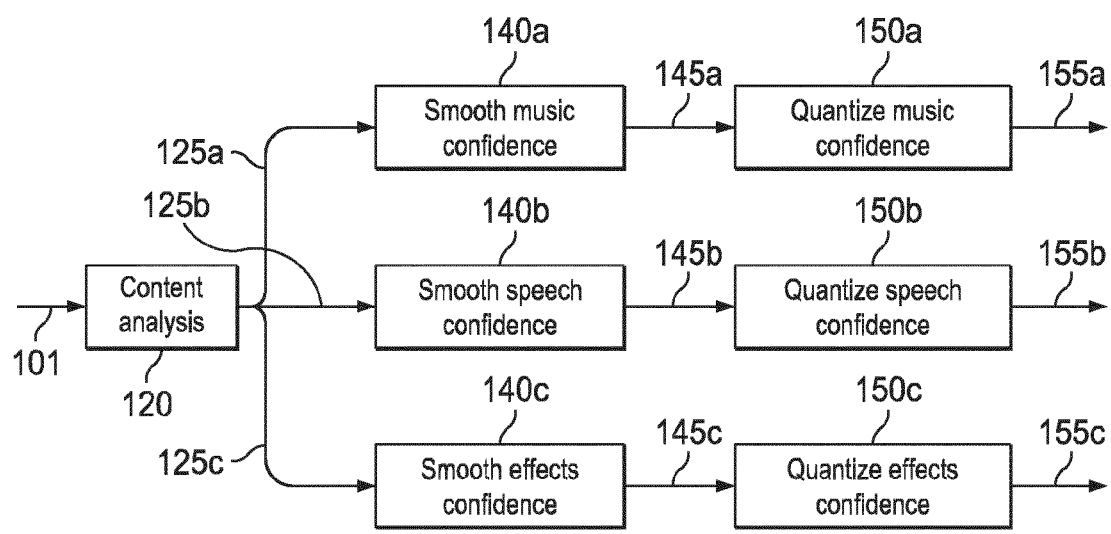

In the example of FIG. 5, the content analysis of the audio content 101 returns a (raw) music confidence value 125*a*, a (raw) speech confidence value 125*b*, and a (raw) effects confidence value 125*c*. In principle, these raw confidence values 125*a*, 125*b*, 125*c* could be directly used for being encoded, as (part of) the classification information 125, into the bitstream 110. Alternatively, classification information 125 (i.e., the raw confidence values 125*a*, 125*b*, 125*c*) can be subjected to smoothing (e.g., time smoothing) before encoding to yield substantially continuous confidence values. This may be done by respective smoothing modules 140*a*, 140*b*, 140*c* that output smoothed confidence values 145*a*, 145*b*, 145*c*, respectively. Therein, different smoothing modules may apply different smoothing, e.g., using different parameters/coefficients for smoothing.

In line with the above, method 400 (or any of methods 600, 700, or 900 described below) may further comprise smoothing the classification information (e.g., confidence values) before multiplexing/encoding.

Smoothing of the classification information (e.g., confidence values) may result in audible distortions under certain circumstances, for example if smoothing is performed across scene transitions. Thus, the smoothing may be disabled depending on circumstances, for example at scene transitions. Moreover, as will be described in more detail below, smoothing may also be disabled for dynamic (non-static) audio content, or in accordance with control input or metadata.

The smoothed music confidence value 145*a*, smoothed speech confidence value 145*b*, and smoothed effects confidence value 145*c* can further be quantized before encoding in some implementations. This can be done at respective quantizers 150*a*, 150*b*, 150*c* that output quantized confidence values 155*a*, 155*b*, 155*c*, respectively. Therein, different quantizers may apply different quantization, e.g., using different parameters for quantization.

In line with the above, method 400 (or any of methods 600, 700, or 900 described below) may further comprise quantizing the classification information (e.g., confidence values) before multiplexing/encoding.

Smoothing of the classification information 125 can result in improved continuity and stability of post processing at the decoder, and hence listening experience. Quantizing the classification information 125 can improve bandwidth efficiency of the bitstream 110.

As has been noted above, determining the classification information 125 at the encoder 105 and providing it to the decoder 115 as part of the bitstream 110 can be advantageous from the point of view of computational capacity. Additionally, doing so may allow some encoder-side control over decoder-side audio post processing by setting the confidence values as transmitted in the audio stream to certain desirable values. For example, an encoder-side user (e.g., content creator) can be given control over the decoder-side audio post processing by making the classification information (at least partially) dependent on user input at the encoder-side. Some example implementations that allow additional encoder-side control over decoder-side audio post processing will be described next.

Figure 6:
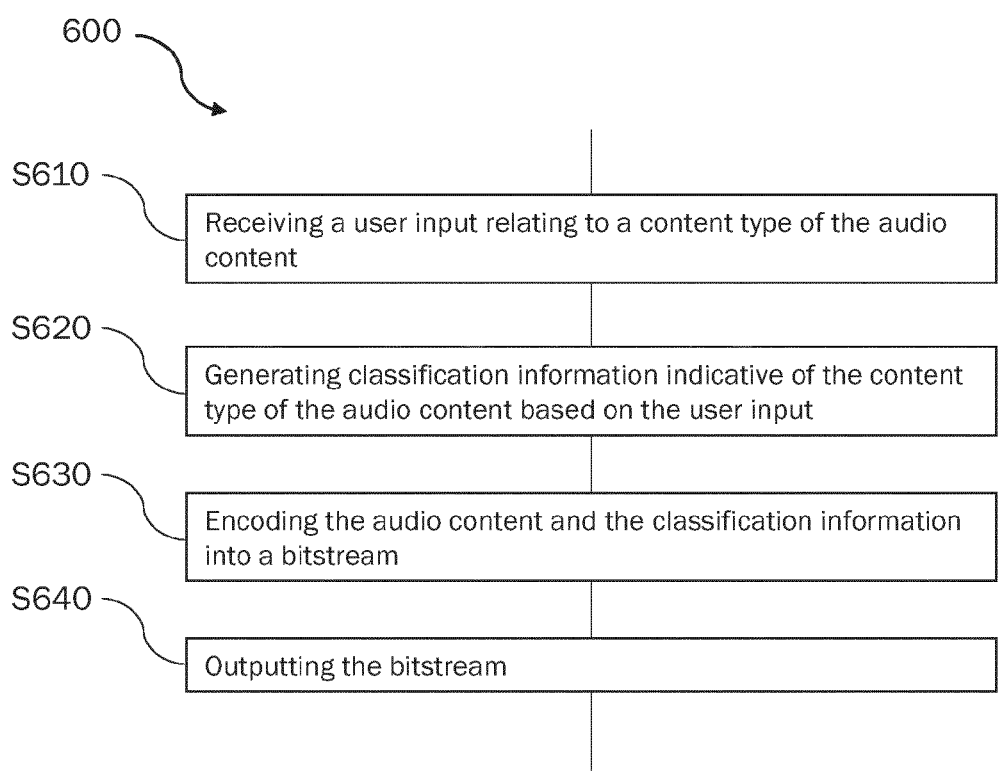

FIG. 6 schematically illustrates, in flow-chart form, an example of a method 600 of encoding audio content that allows for such encoder-side control, based on user input, of decoder-side audio post processing. Method 600 may be performed by the encoder 105 in the encoder-decoder system 100 of FIG. 1, for example.

At step S610 a user input is received. The user can be a content creator, for example. The user input can include manual labels for labeling the audio content as relating to a certain content type, or it can relate to manual confidence values, for example.

At step S620 classification information indicative of the content type of the audio content is generated, at least in part based on the user input. For example, the manual labels and/or manual confidence values can be directly used as the classification information. If the audio content is manually labelled as being of a certain content type, the confidence value for that certain content type can be set to 1 (assuming the confidence values having values between 0 and 1), and the other confidence values can be set to zero. In this case, the content analysis would be bypassed. In alternative implementations, an output of the content analysis can be used together with the user input to derive the classification information. For example, final confidence values can be calculated based on confidence values generated in the content analysis and manual confidence values. This may be done by averaging or any other suitable combination of these confidence values.

At step S630 the audio content and the classification information are encoded into a bitstream.

Finally, at step S640 the bitstream is output.

Additional encoder-side control can be achieved by making the content classification decision at the encoder-side at least in part dependent on metadata associated with the audio content. Two examples of such encoder-side processing will be described below. A first example will be described with reference to FIG. 7 and FIG. 8. In the first example, the audio content is provided in a stream (e.g., linear continuous stream) of audio content as part of an audio program. The metadata for the audio content includes at least an indication of a service type of the audio content (i.e., of the audio program). As such, the service type may also be referred to as an audio program type. Examples of the service type may include a music service (e.g., a music streaming service, or a music broadcast, etc.) or a news (newscast) service (e.g., an audio component of a news channel, etc.). The service type indication may be provided on a frame basis, or it may be the same (uniform/static) for the audio stream. A second example will be described with reference to FIG. 9 and FIG. 10. In the second example, the audio content is provided on a file basis. Each file may contain metadata for its respective audio content. The metadata may include a file content type of the (audio content of) the file. The metadata may further include markers, labels, tags, etc. Examples of the file content type may include an indication that the file is a music file, an indication that the file is a news/newscast file (news clip), an indication that the file includes dynamic (non-static) content (such as, for example, a musical genre of movie that transitions frequently between spoken scenes and musical/song scenes). The file content type may be the same (uniform/static) for the whole file or may change between portions of the file. Processing in the second example may be file based. The "tagging" of files by metadata that indicates the file content type can be said to aid the encoder in deriving the classification information (in addition to providing the encoder-side with additional control over audio post processing at the decoder-side).

Figure 7:
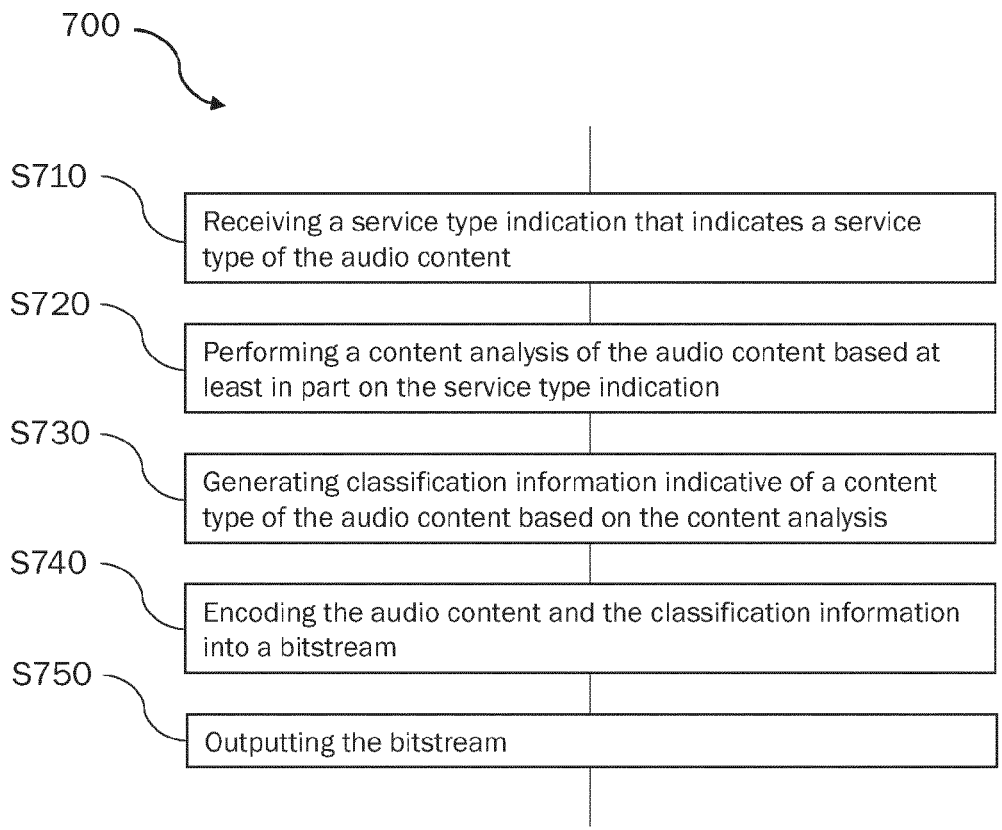

Reference is now made to FIG. 7 which illustrates, in flowchart form, a method 700 of encoding audio content provided in a stream of audio content as part of an audio program. This method 700 takes into account metadata of the audio content when deriving the classification information. Method 700 may be performed by the encoder 105 in the encoder-decoder system 100 of FIG. 1, for example.

At step S710 a service type indication is received. As noted above, the service type indication indicates a service type of the audio content.

At step S720 a content analysis of the audio content is performed based at least in part on the service type indication. Non-limiting examples of such content analysis will be described below with reference to FIG. 8.

At step S730 classification information indicative of a content type of the audio content is generated based on (a result of) the content analysis.

At step S740 the audio content and the classification information are encoded into a bitstream.

Finally, at step S750 the bitstream is output.

Figure 8:
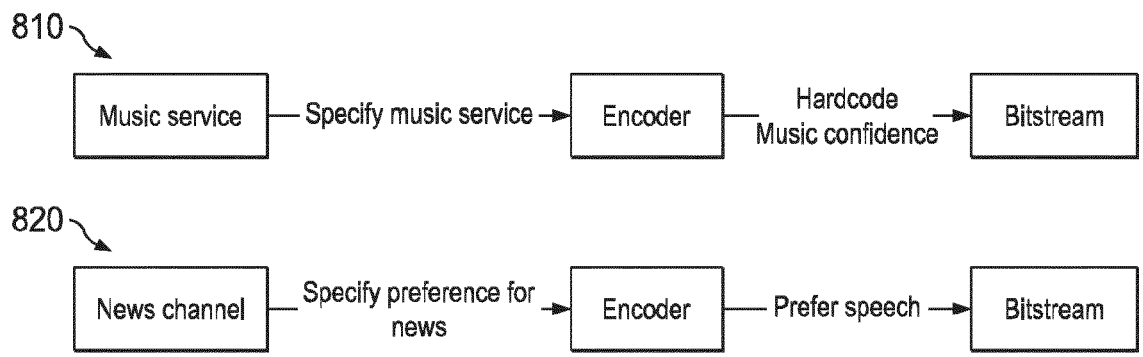

FIG. 8 schematically illustrates examples of the content analysis of audio content at step S720 of method 700. The upper row 810 of FIG. 8 relates to the example of a music service, i.e., the service type indication indicating the audio content to be of service type "music service". In this case, the confidence value for "music" may be set to 1, whereas the confidence values for the other content types (e.g., "speech", "effects", and possibly, "crowd noise") are set to 0. In other words, content type "music" may be hardcoded into the classification information. As such, method 700 may comprise determining, based on the service type indication, whether the service type of the audio content is a music service. Then, in response to the determination that the service type of the audio content is a music service, the classification information may be generated to indicate that the content type of the audio content is music content.

The lower row 820 of FIG. 8 relates to the example of a news service, i.e., the service type indication indicating the audio content to be of service type "news service" (or newscast service, news channel). In this case, the calculations that are used in the content analysis can be adapted so that there is a clear preference for speech and less preference for, e.g., music (e.g., the confidence value for speech content (content type "speech") yielded by the content analysis may be increased, whereas the confidence value for music content (content type "music") and possibly for any remaining content types may be decreased). This means that, e.g., the content type "music" will only be indicated if it is rather certain that the content type is music. In other words, chances for a false indication of content type "music" are reduced by adaptation of the calculations. As such, method 700 may comprise determining, based on the service type indication, whether the service type of the audio content is a newscast service. Then, in response to the determination that the service type of the audio content is a newscast service, the content analysis at step S720 may be adapted to have a higher likelihood to indicate the audio content to be speech content. Additionally, the content analysis at step S720 may be adapted to have a lower likelihood to indicate the audio content to be of any other content type.

In some implementations, one or more confidence values for the audio content can be directly provided by user input (e.g., by a content creator) or as part of the metadata. Then, it may depend on the service type indication whether these confidence values are taken into account. For example, the confidence values provided by user input or metadata can be used for encoding as the classification information if (and only if) the service type of the audio content is of a certain type. In some alternative implementations, the confidence values provided by user input or metadata can be used as part of the classification information unless the service type of the audio content is of a certain type. For instance, the confidence values provided by user input or metadata can be used unless the service type indication indicates that the service type of the audio content is a music service. In the latter case, the confidence value for music content may be set to 1, regardless of the confidence values provided by user input or metadata.

Figure 9:
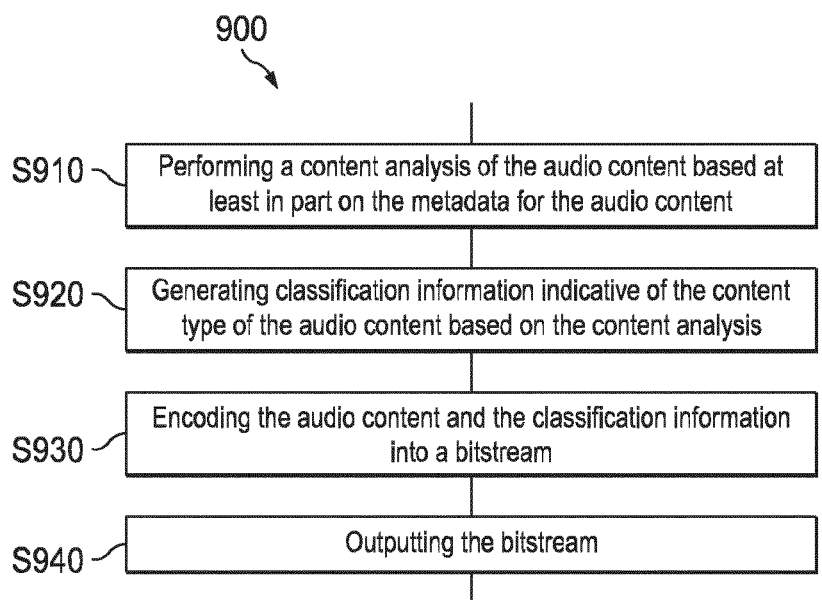

Reference is now made to FIG. 9 which illustrates, in flowchart form, a method 900 of encoding audio content that is provided on a file basis. Accordingly, method 900 may be performed on a file basis. This method 900 takes into account file metadata of the audio content when deriving the classification information. Method 900 may be performed by the encoder 105 in the encoder-decoder system 100 of FIG. 1, for example.

At step S910 a content analysis of the audio content is performed based at least in part on the (file) metadata for the audio content. For example, the metadata can include a file content type indication that indicates a file content type of the file. Then, the content analysis may be based at least in part on the file content type indication. Non-limiting examples of such content analysis based at least in part on the content type of the file will be described below with reference to FIG. 10.

At step S920 classification information indicative of a content type of the audio content is generated based on (a result of) the content analysis.

At step S930 the audio content and the classification information are encoded into a bitstream.

Finally, at step S940 the bitstream is output.

Figure 10:
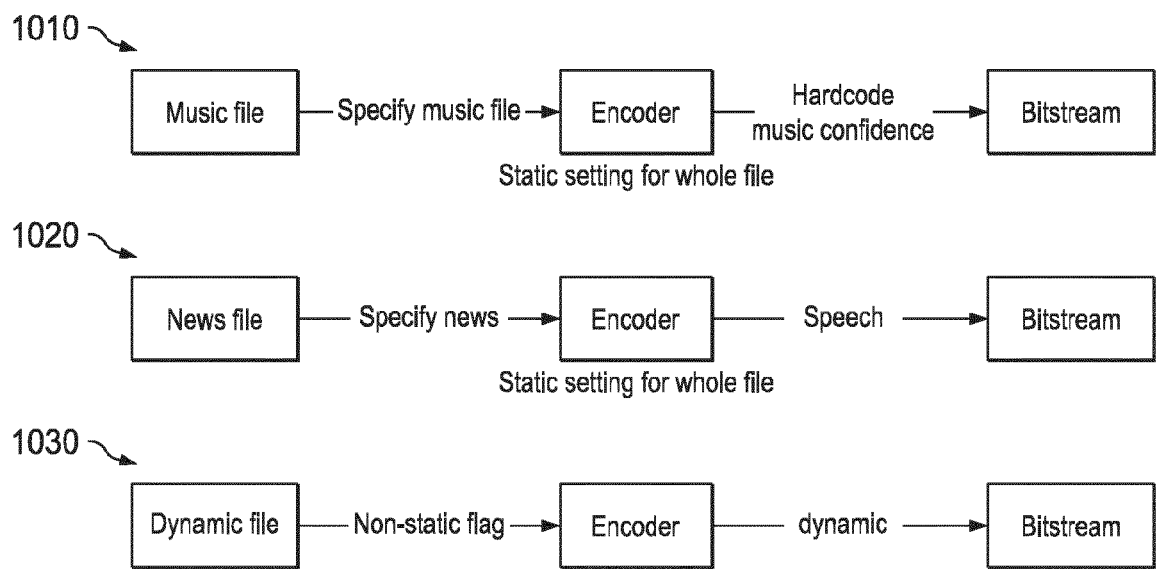

FIG. 10 schematically illustrates an example of the content analysis of audio content at step S910 of method 900. The upper row 1010 of FIG. 10 relates to the example of a music file, i.e., the file content type indication indicating the file content to be of file content type "music". In this case, the content type "music" may be hardcoded into the classification information. Moreover, the classification information may be made uniform (static) for the whole file. Accordingly, the method 900 may further comprise determining, based on the file content type indication, whether the file content type of the file is a music file. Then, in response to the determination that the file content type of the file is a music file, the classification information may be generated to indicate that the content type of the audio content is music content.

The middle row 1020 of FIG. 10 relates to the example of a news file, i.e., the file content type indication indicating the file content to be of file content type "news". In this case, method 900 may further comprise determining, based on the file content type indication, whether the file content type of the file is a newscast file. Then, in response to the determination that the file content type of the file is a newscast file, the content analysis may be adapted to have a higher likelihood to indicate the audio content to be speech content. This may be achieved by adapting one or more calculations (calculation algorithms) of the content analysis to increase a likelihood/confidence for speech content in the content analysis and/or by adapting the one or more calculations to decrease likelihoods/confidences for content types other than speech content. Again, the classification information may be made uniform (static) for the whole file.

The lower row 1030 of FIG. 10 relates to the example of a dynamic (non-static) file (e.g., a musical genre of movie that transitions frequently between spoken scenes and musical/song scenes), i.e., the file content type indication indicating the file content to be of file content type "dynamic". In this case, the method 900 may further comprise determining, based on the file content type indication, whether the file content type of the file is dynamic content (i.e., dynamic file content). Then, in response to the determination that the file content type of the file is dynamic content (i.e., dynamic file content), the content analysis may be adapted to allow for a higher transition rate between different content types. For example, the content type may be allowed to transition more frequently between content types, for example between music and non-music (i.e., more frequently than for the steady state). Accordingly, the classification information may be allowed to switch between, e.g., music sections and non-music sections of the file. Different from the first two rows 1010 and 1020 of FIG. 10, this means that the classification information is not kept uniform (static) for the whole file.

It is also understood that dynamic content (i.e., dynamic file content) can have sharp transitions between sections of different content type in the file. For example, there may be sharp transitions between music sections and non-music sections. In such cases it may not make sense to apply time smoothing to the classification information (e.g., to the confidence values). In some implementations, smoothing of the classification information (time smoothing) may thus be disabled for dynamic content (i.e., dynamic file content).

Next, embodiments and implementations relating to decoding of audio content from a bitstream including audio content and classification information for the audio content will be described. It is understood that the classification information indicates a content classification (as to the content type) of the audio content. It is also understood that the content classification may be based on a content analysis that has been performed at the encoder-side.

Figure 11:
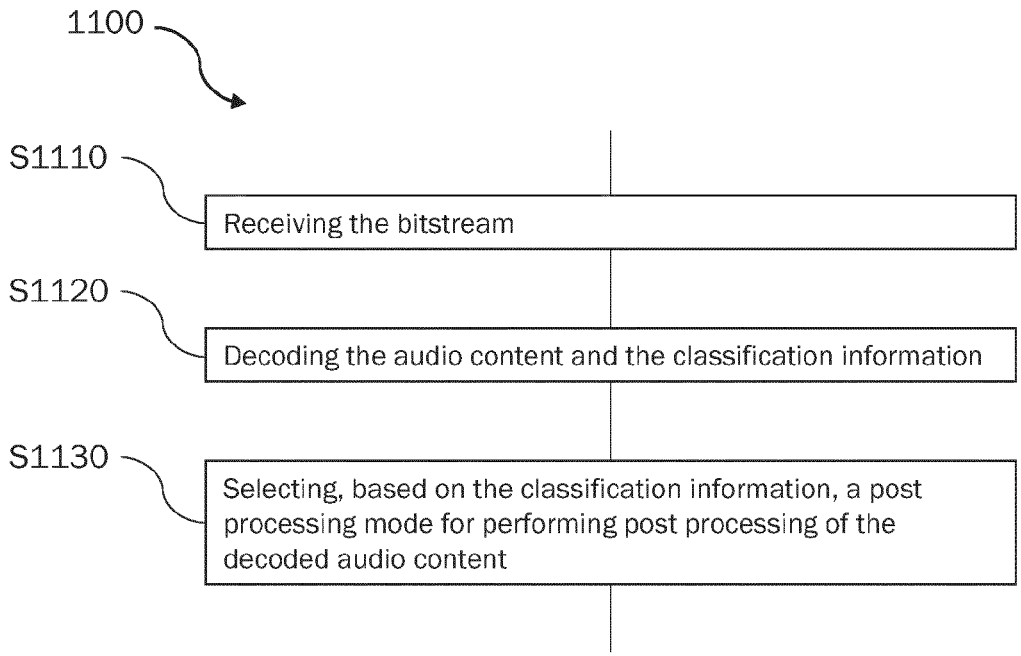

FIG. 11 illustrates, in flowchart form, a generic method 1100 of decoding the audio content from the bitstream. Method 1100 may be performed by the decoder 115 in the encoder-decoder system 100 of FIG. 1, for example.

At step S1110 the bitstream is received, for example by wireless or wired transmission, or via a storage medium storing the bitstream.

At step S1120 the audio content and the classification information are decoded from the bitstream.

At step S1130 a post processing mode for performing (audio) post processing of the decoded audio content is selected based on the classification information obtained at step S1120. In some implementations, selecting the post processing mode can be further based on a user input.

Additionally, method 1100 may further include performing a content analysis of the audio content to determine one or more additional confidence values (e.g., for content types that have not been taken into account by the encoder-side). This content analysis may proceed in the same manner as described above with reference to step S410 in method 400. Then, the selection of the post processing mode may be further based on the one or more additional confidence values. For example, if a decoder comprises a detector for a content type that had not been considered by a (legacy) encoder, the decoder may calculate a confidence value for this content type and use this confidence value together with any confidence values transmitted in the classification information for selecting the post processing mode.

As described above in the context of FIG. 1, post processing may be performed using post processing algorithms, such as respective algorithms implementing an (intelligent/dynamic) equalizer, an (adaptive) virtualizer, a surround processor, a dialogue enhancer, an upmixer, or a cross-fader, for example. Accordingly, selecting a mode for performing post processing may be said to correspond to determining (e.g., calculating) one or more control weights (steering weights, algorithm steering weights, algorithm control weights) for respective processes/modules/algorithms for post processing.

Figure 12:
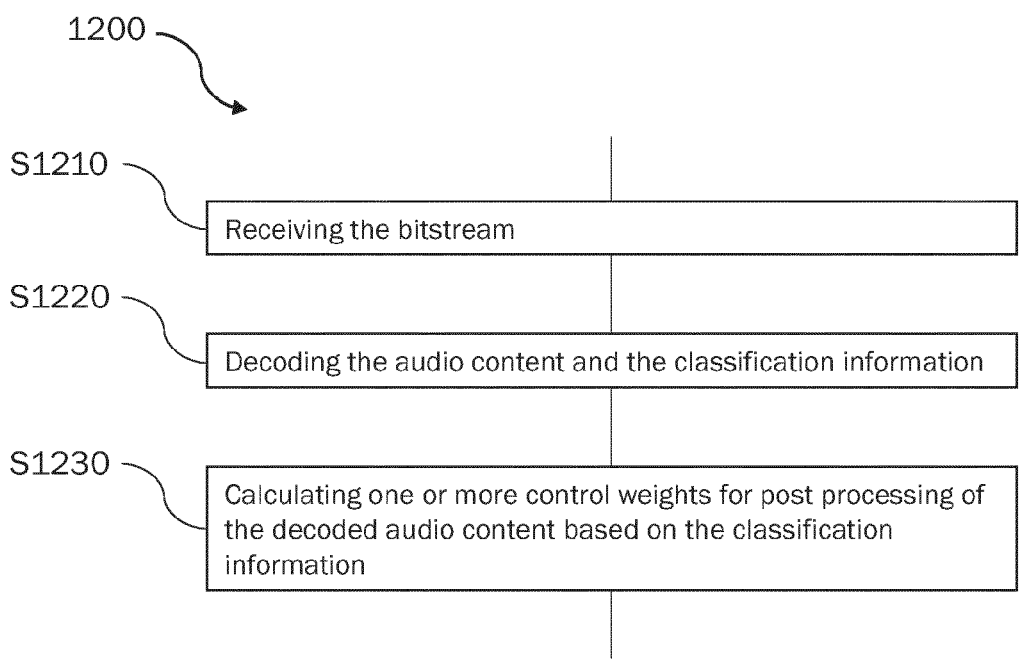

A corresponding method 1200 is illustrated by the flowchart of FIG. 12. Again, this method 1200 may be performed by the decoder 115 in the encoder-decoder system 100 of FIG. 1, for example.

Step S1210 and step S1220 are identical to step S1110 and step S1120 of method 1100, respectively.

At step S1230 one or more control weights for post processing of the decoded audio content are determined (e.g., calculated) based on the classification information obtained at step S1220.

Transmitting the confidence values instead of the control weights (steering weights), i.e., leaving the weight calculation module in the decoder instead of moving it to the encoder, not only enables conservation of computational resources at the decoder, but it can also enable a customizable and flexible decoder, in which the weight calculation can be personalized. For example, the weight calculation can depend on a device type and/or a user's personal preferences. This is in contrast to conventional approaches, in which the decoder receives specific instructions from the encoder as to which audio post processing is to be performed for the decoded audio content.

Namely, requirements of audio post processing may depend on a device type of the device by which the decoded audio content is replayed. For example, replay of the decoded audio content by the speakers of a mobile device (such as, e.g., a mobile phone) with only two speakers may require different audio post processing than replay of the decoded audio content by a soundbar device with five or more speakers. Accordingly, in some implementations, the calculation of the control weights depends on a device type of a device that performs the decoding. In other words, the calculation may be end-point specific, or personalized. For example, the decoder-side may implement a set of end-point specific processes/modules/algorithms for post processing, and parameters (control weights) for these processes/modules/algorithms may be determined based on the confidence values in an end-point specific manner.

Moreover, different users may have different preferences for audio post processing. For example, speech is typically not virtualized, but it could be decided, based on the user's preferences, to virtualize speech-heavy audio content (i.e., virtualization may be applied to speech if desired by the user). As another example, for audio replay at a personal computer, there is typically no stereo widening, upmixing, and virtualization. However, depending on the user's preferences, stereo widening, upmixing, and/or virtualization could be applied in this case (i.e., stereo widening, upmixing, and/or virtualization may be applied for a PC user, if desired by the user). Accordingly, in some implementations the calculation of the control weights is further based on a user preference or a user input (e.g., user input indicating the user preference). As such, the user input may override or partially override the classification-information-based calculation.

If the classification information comprises confidence values (confidence scores) that are each associated with a respective content type and give an indication of a likelihood that the audio content is of the respective content type, as described above, the control weights may be calculated based on these confidence values. Non-limiting examples of such calculations will be described below.

Additionally, method 1200 may further include performing a content analysis of the audio content to determine one or more additional confidence values (e.g., for content types that have not been taken into account by the encoder-side). This content analysis may proceed in the same manner as described above with reference to step S410 in method 400. Then, the calculation of the control weights mode may be further based on the one or more additional confidence values. For example, if a decoder comprises a detector for a content type that had not been considered by a (legacy) encoder, the decoder may calculate a confidence value for this content type and use this confidence value together with any confidence values transmitted in the classification information for calculating the control weights.

As noted above, the confidence values may be smoothed at the encoder-side in a dual-ended encoder-decoder system to accurately and stably reflect the content being encoded. Alternatively or additionally, the weight calculation at the decoder-side may provide further smoothing when determining the control weights (algorithm steering weights). Thereby, it can be ensured that each post processing algorithm has the appropriate level of continuity to avoid audible distortions. For example, a virtualizer may want slow changes to avoid unwanted variation in the spatial image, whilst a dialogue enhancer may want fast changes to ensure that dialogue frames are reacted to but non dialogue frames minimize any erroneous dialogue enhancement. Accordingly, method 1200 may further comprise a step of smoothing (time smoothing) the control weights.

The smoothing may depend on a device type of a device that performs the decoding. For example, there may be different smoothing between a virtualizer control weight for a mobile device (e.g., mobile phone) and a virtualizer control weight for a TV set or soundbar device. Therein, the smoothing may be different with regard to a set of smooth coefficients that determine the smoothing, such as a time constant of the smoothing, for example.

Moreover, the smoothing may also depend on the specific control weight that is smoothed. That is, the smoothing may be different between at least two control weights. For example, there may be no or little smoothing for the dialogue enhancer control weight and/or stronger smoothing for the virtualizer control weight.

Finally, it is to be noted that smoothing may be disabled depending on circumstances. As noted above, smoothing may be counterproductive for audio content flagged as dynamic (non-static), or at scene transitions. Also, smoothing may be disabled in accordance with control input and/or metadata.

Another approach to improving continuity/stability of the control weights (and thereby, of the audio post processing) is to apply a non-linear mapping $\Phi$ to the control weights. Values of the control weights may be in the range from 0 to 1. The non-linear mapping $\Phi$ may be a mapping $\Phi: [0,1] \rightarrow [0,1]$. Preferably, the non-linear mapping $\Phi$ maps values of the control values close to the boundaries of the value range of the control weights (i.e., the domain range, such as $[0,1]$) closer to respective boundaries of the value range of the mapped values (i.e., the image range, such as $[0,1]$). That is, $\Phi$ may map a value $0+\varepsilon (\varepsilon \ll 1)$ closer towards 0, i.e., $\Phi(0+\varepsilon) < (0+\varepsilon)$, and may map a value $1-\varepsilon$ closer towards 1, i.e., $\Phi(1-\varepsilon) > (1-\varepsilon)$. An example of such non-linear mapping $\Phi$ is a sigmoid function.

Figure 13:
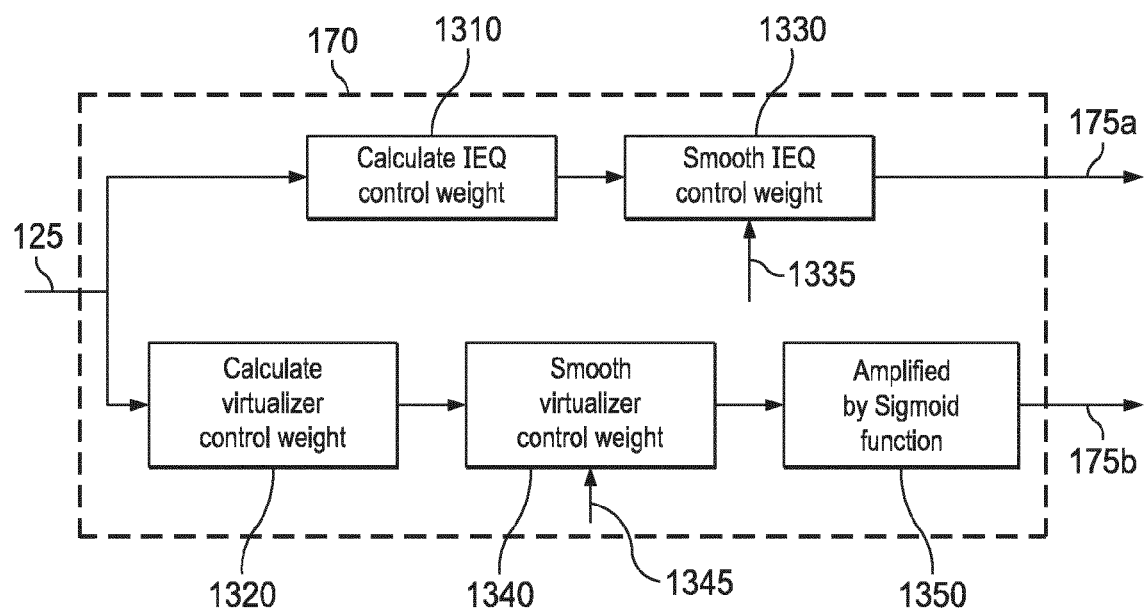

FIG. 13 schematically illustrates an example of a weight calculation module 170 that operates in accordance with the above considerations. It is understood that the weight calculation module 170 described below may be implemented by a processor of a computing device, for example.

Without intended limitation, the weight calculation module 170 in this example determines a control weight for an intelligent/dynamic equalizer and a control weight for a virtualizer. It is understood that other control weights may be calculated as well by the weight calculation module 170.

The weight calculation module 170 receives the confidence values (i.e., the classification information 125) as an input. Based on the confidence values, a control weight for the intelligent/dynamic equalizer is calculated at block 1310. Since equalization could alter timbre of speech and is thus typically not desired for speech, in some implementations the control weight for the intelligent/dynamic equalizer (equalizer control weight) may be calculated such that equalization is disabled if the classification information (e.g., the confidence values) indicates that the content type of the decoded audio content is speech or likely to be speech (e.g., if the speech confidence value is above a certain threshold). Optionally, the equalizer control weight may be smoothed at block 1330. The smoothing may depend on equalizer control weight smooth coefficients 1335 that may be specific to smoothing of the equalizer control weight. Eventually, a (smoothed) equalizer control weight 175*a* is output by the weight calculation module 170.

The confidence values are also used for calculating a control weight for the virtualizer (virtualizer control weight) at block 1320. Since virtualization could alter musical timbre and is thus typically not desired for music, in some implementations the control weight for the virtualizer may be calculated such that virtualization (speaker virtualization) is disabled if the classification information (e.g., the confidence values) indicates that the content type of the decoded audio content is music or likely to be music (e.g., if the music confidence value is above a certain threshold). Also, the control weight for the virtualizer may be calculated such that the coefficients of the virtualizer scale between pass through (no processing) and full virtualization. As an example, the control weight for the virtualizer may be calculated based on the music confidence value music_confidence, the speech confidence value speech_confidence and the effects confidence value effects_confidence via $$1-\text{music\_confidence}*\{1-\max[\text{effects\_confidence}, \text{speech\_confidence}]^2\} \quad \text{(Eq. 1)}$$

Optionally, the virtualizer control weight may be smoothed at block 1340. The smoothing may depend on virtualizer control weight smooth coefficients 1345 that may be specific to smoothing of the virtualizer control weight.

Further optionally, the (smoothed) virtualizer control weight may be amplified, for example by a sigmoid function, at block 1350 to improve stability/continuity of the virtualizer control weight. Thereby, audible artifacts in a rendered representation of the post processed audio content can be reduced. The amplification may proceed in accordance with the non-linear mapping described above.

Eventually, a (smoothed and/or amplified) virtualizer control weight 175*b* is output by the weight calculation module 170.

The confidence values can also be used for calculating a control weight for the dialogue enhancer (dialogue enhancer control weight; not shown in the figure). The dialogue enhancer may detect, in the frequency domain, time-frequency tiles that contain dialogue. These time-frequency tiles can then be selectively enhanced, thereby enhancing dialogue. Since the prime purpose of the dialogue enhancer is to enhance dialogue and applying dialogue enhancement to dialogue-free content is, at best, a waste of computational resources, the dialogue enhancer control weight may be calculated such that dialog enhancement by the dialog enhancer is enabled if (and only if) the classification information indicates that the content type of the audio content is speech or likely to be speech. This may be the case for example if the confidence value for speech is above a given threshold. Similarly as for the equalizer control weight and the virtualizer control weight, also the dialogue enhancer control weight may be subject to smoothing and/or amplification.

Yet further, the confidence values can be used for calculating a control weight for a surround processor (surround processor control weight; not shown in the figure), an upmixer, and/or a cross-fader.

Figure 14:
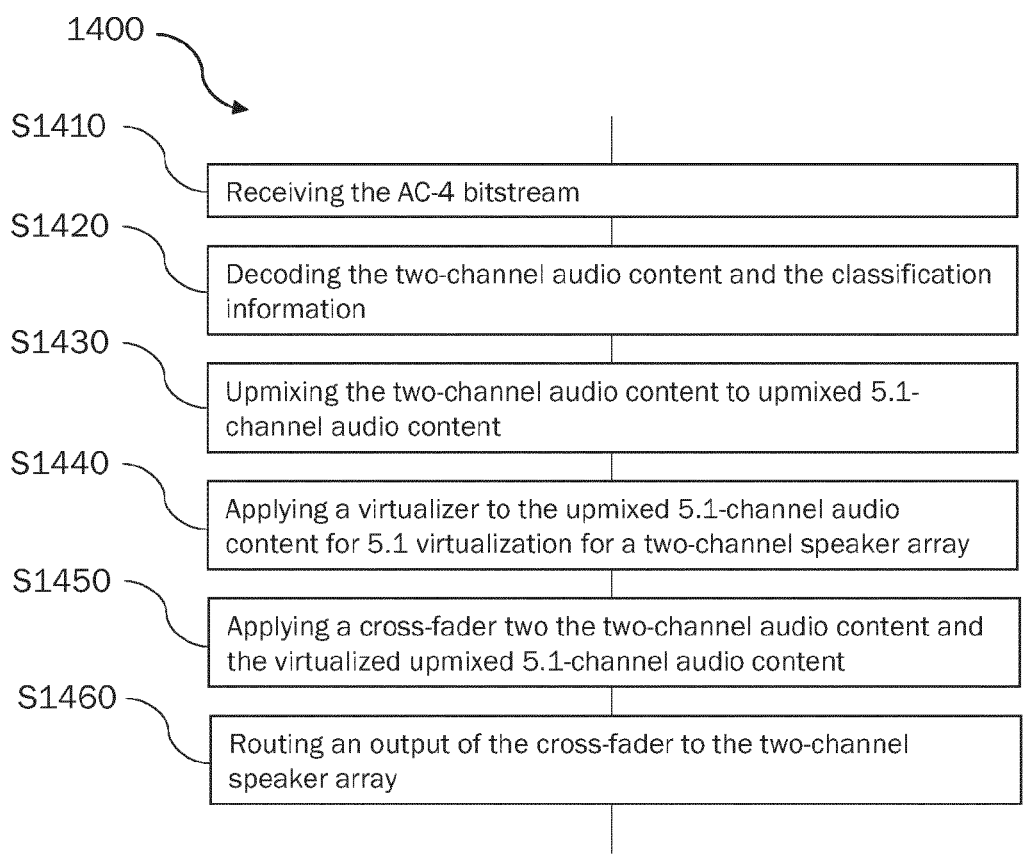

FIG. 14 illustrates, in flowchart form, a method 1400 of decoding the audio content from the bitstream in the special case of two-channel (e.g., stereo) audio content for reproduction by a mobile device (e.g., mobile phone) with two speakers, according to embodiments of the disclosure. It is understood that the bitstream includes classification information or the two-channel audio content and that the classification information is indicative of a content classification (e.g., as to the content type) of the two-channel audio content. Method 1400 may be performed by a decoder of a mobile device with two speakers. This decoder may have the same basic configuration as the decoder 115 in the encoder-decoder system 100 of FIG. 1, for example, with specific implementations of the weight calculation and post processing.

At step S1410 the AC-4 bitstream is received.

At step S1420 the two-channel audio content and the classification information are decoded/demultiplexed from the bitstream.

At step S1430 the two-channel audio content decoded at step S1420 is upmixed to upmixed 5.1-channel audio content.

At step S1440 a virtualizer is applied to the upmixed 5.1-channel audio content for 5.1 virtualization for a two-channel speaker array. The virtualizer operates under control of a respective control weight. The control weight for the virtualizer is calculated based on the classification information (e.g., confidence values). This may be done for example in the manner described above with reference to FIG. 13.

At step S1450 a cross-fader is applied to the two-channel audio content and the virtualized upmixed 5.1-channel audio content. The cross-fader operates under control of a respective control weight. The control weight for the cross fader is calculated based on the classification information (e.g., confidence values).

Finally, at step S1460 an output of the cross-fader is routed to the two-channel speaker array.

Figure 15:
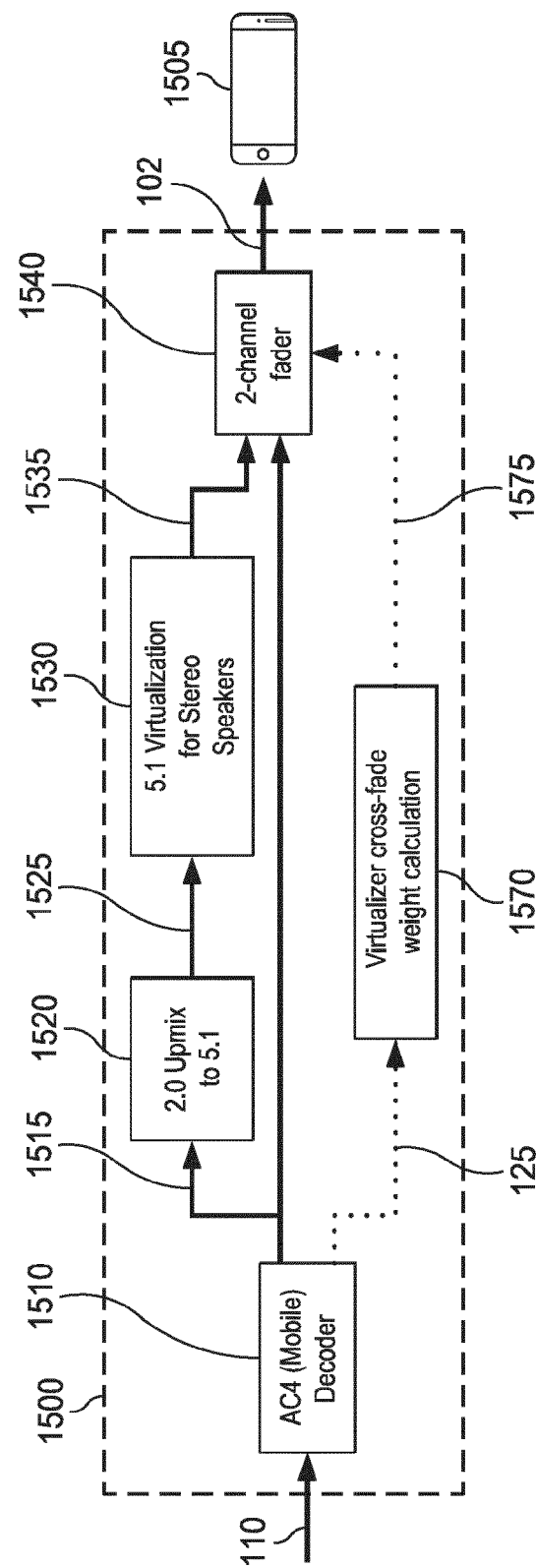

FIG. 15 schematically illustrates an example of a decoder 1500 of a two-speaker mobile device 1505 that may perform method 1400, according to embodiments of the disclosure. It is understood that the modules of the decoder 1500 described below may be implemented by a processor of a computing device, for example.

The decoder 1500 receives the bitstream 110 (e.g., an AC-4 bitstream), which is then decoded/demultiplexed by AC-4 (mobile) decoder module 1510. The AC-4 (mobile) decoder module 1510 outputs decoded two-channel audio content 1515 and decoded classification information 125. The decoded classification information 125 is provided to a virtualizer cross-fade weight calculation module 1570 that calculates a cross-fade control weight 1575 based on the classification information 125 (e.g., confidence values). The cross-fade control weight 1575 may be a parameter determining a relative weight of two signals that are combined by a cross-fade module 1540. The decoded two-channel audio content 1515 is upmixed from 2.0 channels to 5.1 channels by an upmix module 1520, which outputs upmixed 5.1-channel audio content 1625. 5.1 virtualization for stereo speakers is then applied to the upmixed 5.1-channel audio content 1525 by a virtualization module (virtualizer) 1530. The virtualization module outputs virtualized upmixed 5.1-channel audio content 1535, which is then combined with the original decoded two-channel audio content by the cross-fade module 1540. The cross-fade module 1540 operates under control of the cross-fade control weight 1575 and finally outputs post processed two-channel audio content 102 for routing to the speakers of the mobile device 1505.

Although not shown in the figure, the decoder 1500 may also include a module for calculating a virtualizer control weight for the virtualization module 1530 based on the classification information 125 (e.g., confidence values). Yet further, the decoder 1500 may include a module for calculating an upmix control weight for the upmix module 1520 based on the classification information 125 (e.g., confidence values).

Figure 16:
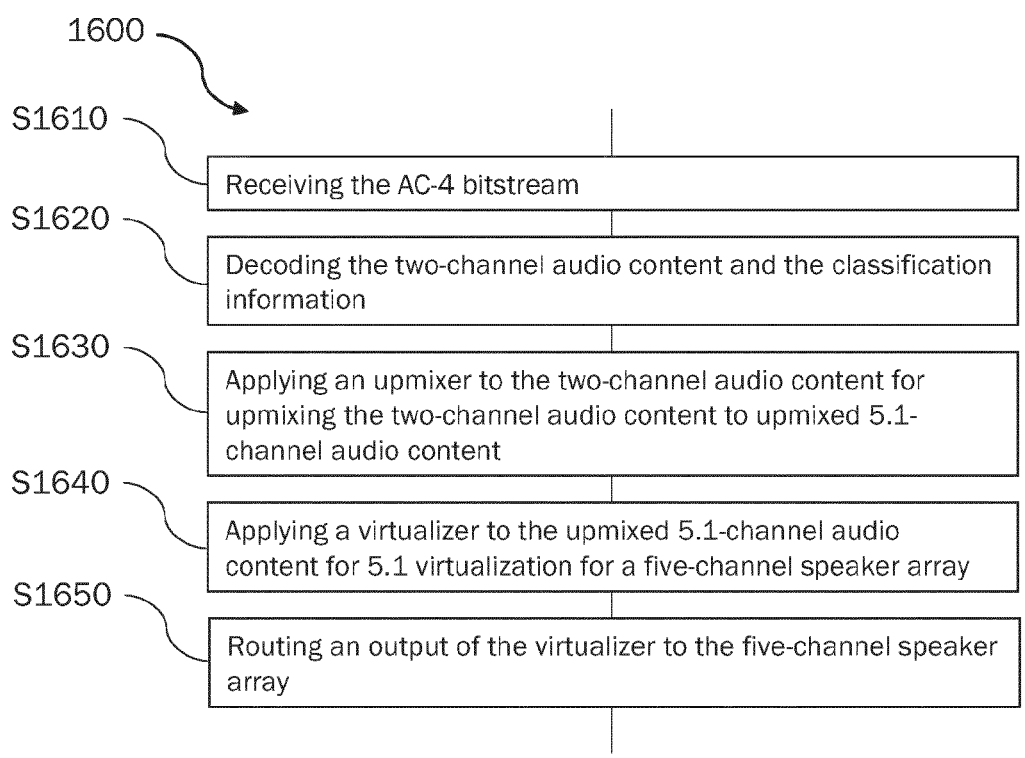

FIG. 16 illustrates, in flowchart form, a method 1600 of decoding the audio content from the bitstream in the special case of two-channel (e.g., stereo) audio content for reproduction by a five (or more) speaker array of, e.g., a soundbar device, according to embodiments of the disclosure. It is again understood that the bitstream includes classification information or the two-channel audio content and that the classification information is indicative of a content classification (e.g., as to the content type) of the two-channel audio content. Method 1600 may be performed by a decoder of a device with a five (or more) speaker array, such as a soundbar device, for example. This decoder may have the same basic configuration as the decoder 115 in the encoder-decoder system 100 of FIG. 1, for example, with specific implementations of the weight calculation and post processing.

At step S1610 the AC-4 bitstream is received.

At step S1620 the two-channel audio content and the classification information are decoded/demultiplexed from the bitstream.

At step S1630 an upmixer is applied to the two-channel audio content for upmixing the two-channel audio content to upmixed 5.1-channel audio content. The upmixer operates under control of a respective control weight. The control weight for the upmixer is calculated based on the classification information (e.g., confidence values). The control weight for the upmixer may relate to an upmix weight, for example.

At step S1640 a virtualizer is applied to the upmixed 5.1-channel audio content for 5.1 virtualization for a five-channel speaker array. The virtualizer operates under control of a respective control weight. The control weight for the virtualizer is calculated based on the classification information (e.g., confidence values). This may be done for example in the manner described above with reference to FIG. 13.

Finally, at step S1650 an output of the virtualizer is routed to the five-channel speaker array.

Figure 17:
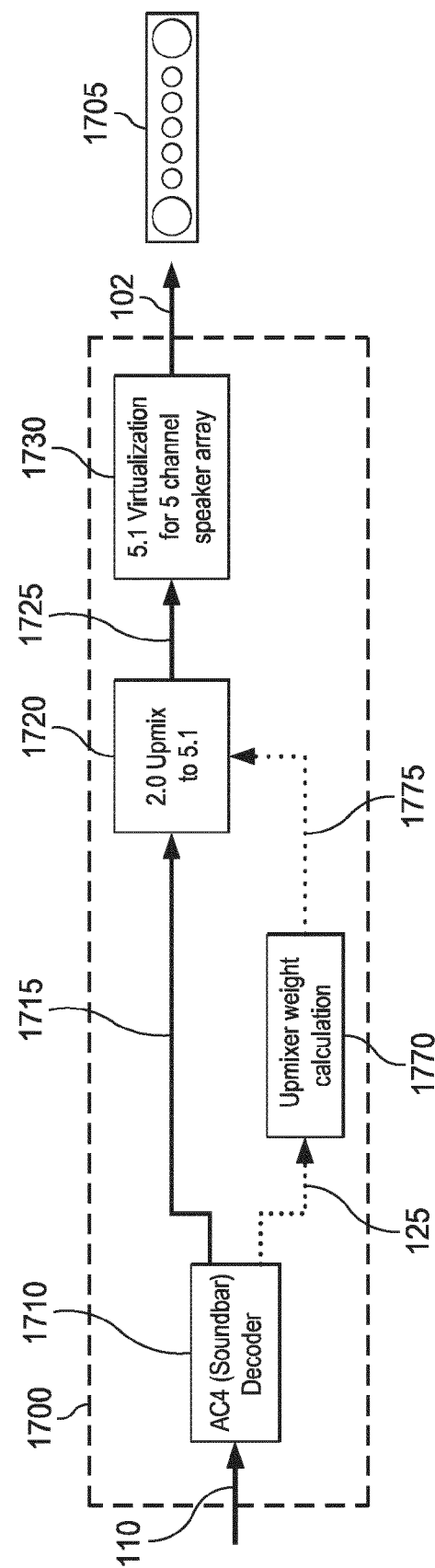

FIG. 17 schematically illustrates an example of a decoder 1700 of a soundbar device 1705 that may perform method 1600, according to embodiments of the disclosure. It is understood that the modules of the decoder 1700 described below may be implemented by a processor of a computing device, for example.

The decoder 1700 receives the bitstream 110 (e.g., AC-4 bitstream), which is then decoded/demultiplexed by AC-4 (soundbar) decoder module 1710. The AC-4 (soundbar) decoder module 1710 outputs decoded two-channel audio content 1715 and decoded classification information 125. The decoded classification information 125 is provided to an upmix weight calculation module 1770 that calculates an upmix control weight 1775 based on the classification information 125 (e.g., confidence values). The upmix control weight 1775 may be an upmix weight, for example. The decoded two-channel audio content 1715 is upmixed from 2.0 channels to 5.1 channels by an upmix module 1720, which outputs upmixed 5.1-channel audio content. The upmix module 1720 operates under control of the upmix control weight 1775. For example, different upmixing (with different upmix control weights) may be performed for music and speech. A virtualization module (virtualizer) 1730 then applies 5.1 virtualization for a five channel speaker array to the upmixed 5.1-channel audio content 1725 and outputs virtualized upmixed 5.1-channel audio content. The virtualized upmixed 5.1-channel audio content is finally output as post processed 5.1-channel audio content 102 for routing to the speakers of the soundbar device 1705.

Although not shown in the figure, the decoder 1700 may also include a module for calculating a virtualizer control weight for the virtualization module 1730 based on the classification information 125 (e.g., confidence values), for example in the manner described above with reference to FIG. 13.

Notably, methods 1400 and 1600 as well as corresponding decoders 1500 and 1700 are examples for end-point specific audio post processing.

Various aspects of the present invention may be appreciated from the following enumerated example embodiments (EEEs):

1. A method of encoding audio content, the method comprising:
performing a content analysis of the audio content;
generating classification information indicative of a content type of the audio content based on the content analysis;
encoding the audio content and the classification information in a bitstream; and
outputting the bitstream.

2. The method according to EEE 1, wherein the content analysis is based at least in part on metadata for the audio content.

3. A method of encoding audio content, the method comprising:
receiving a user input relating to a content type of the audio content;
generating classification information indicative of the content type of the audio content based on the user input;
encoding the audio content and the classification information in a bitstream; and
outputting the bitstream.

4. The method according to EEE 3, wherein the user input includes one or more of:
a label indicating the audio content to be of a given content type; and
one or more confidence values, each confidence value being associated with a respective content type and giving an indication of a likelihood that the audio content is of the respective content type.

5. A method of encoding audio content, wherein the audio content is provided in a stream of audio content as part of an audio program, the method comprising:
receiving a service type indication that indicates a service type of the audio content;
performing a content analysis of the audio content based at least in part on the service type indication;
generating classification information indicative of a content type of the audio content based on the content analysis;
encoding the audio content and the classification information in a bitstream; and
outputting the bitstream.

6. The method according to EEE 5, further comprising:
determining, based on the service type indication, whether the service type of the audio content is a music service; and
in response to the determination that the service type of the audio content is a music service, generating the classification information to indicate that the content type of the audio content is music content.

7. The method according to EEE 5 or 6, further comprising:
determining, based on the service type indication, whether the service type of the audio content is a newscast service; and
in response to the determination that the service type of the audio content is a newscast service, adapting the content analysis to have a higher likelihood to indicate the audio content to be speech content.

8. The method according to any one of EEEs 5 to 7, wherein the service type indication is provided on a frame-by-frame basis.

9. A method of encoding audio content, wherein the audio content is provided on a file basis and wherein the files include metadata for their respective audio content, the method comprising:
performing a content analysis of the audio content based at least in part on the metadata for the audio content;
generating classification information indicative of a content type of the audio content based on the content analysis;
encoding the audio content and the classification information in a bitstream; and
outputting the bitstream.

10. The method according to EEE 9,
wherein the metadata includes a file content type indication that indicates a file content type of the file; and
wherein the content analysis is based at least in part on the file content type indication.

11. The method according to EEE 10, further comprising:
determining, based on the file content type indication, whether the file content type of the file is a music file; and
in response to the determination that the file content type of the file is a music file, generating the classification information to indicate that the content type of the audio content is music content.

12. The method according to EEE 10 or 11, further comprising:
determining, based on the file content type indication, whether the file content type of the file is a newscast file; and
in response to the determination that the file content type of the file is a newscast file, adapting the content analysis to have a higher likelihood to indicate the audio content to be speech content.

13. The method according to any one of EEEs 10 to 12, further comprising:
determining, based on the file content type indication, whether the file content type of the file is dynamic; and
in response to the determination that the file content type of the file is dynamic content, adapting the content analysis to allow for a higher transition rate between different content types.

14. The method according to any one of EEEs 1 to 13, wherein the classification information comprises one or more confidence values, each confidence value being associated with a respective content type and giving an indication of a likelihood that the audio content is of the respective content type.

15. The method according to any one of EEEs 1 to 14, wherein the content types include one or more of music content, speech content or effects content.

16. The method according to any one of EEEs 1 to 15, further comprising:
encoding an indication of scene transitions in the audio content into the bitstream.

17. The method according to any of EEEs 1 to 16, further comprising:
smoothing of the classification information before encoding.

18. The method according to any one of EEEs 1 to 17, further comprising:
quantizing the classification information before encoding.

19. The method according to any one of EEEs 1 to 18, further comprising:
encoding the classification information into a specific data field in a packet of the bitstream.

20. A method of decoding audio content from a bitstream including audio content and classification information for the audio content, wherein the classification information is indicative of a content classification of the audio content, the method comprising:
receiving the bitstream;
decoding the audio content and the classification information; and
selecting, based on the classification information, a post processing mode for performing post processing of the decoded audio content.

21. The method according to EEE 20, wherein the selecting of the post-processing mode is further based on a user input.

22. A method of decoding audio content from a bitstream including audio content and classification information for the audio content, wherein the classification information is indicative of a content classification of the audio content, the method comprising:
receiving the bitstream;
decoding the audio content and the classification information; and
calculating one or more control weights for post processing of the decoded audio content based on the classification information.

23. The method according to EEE 22,
wherein the classification information comprises one or more confidence values, each confidence value being associated with a respective content type and giving an indication of a likelihood that the audio content is of the respective content type; and
wherein the control weights are calculated based on the confidence values.

24. The method according to EEE 22 or 23, wherein the control weights are control weights for respective modules for post processing of the decoded audio content.

25. The method according to any one of EEEs 22 to 24, wherein the control weights include one or more of a control weight for an equalizer, a control weight for a virtualizer, a control weight for a surround processor, and a control weight for a dialogue enhancer.

26. The method according to any one of EEEs 22 to 25, wherein the calculation of the control weights depends on a device type of a device that performs the decoding.

27. The method according to any one of EEEs 22 to 26, wherein the calculation of the control weights is further based on a user input.

28. The method according to any one of EEEs 22 to 27, wherein the calculation of the control weights is further based on a number of channels of the audio content.

29. The method according to any one of EEEs 22 to 28,
wherein the control weights include a control weight for a virtualizer; and
wherein the control weight for the virtualizer is calculated such that the virtualizer is disabled if the classification information indicates that the content type of the audio content is music or likely to be music.

30. The method according to any one of EEEs 22 to 29,
wherein the control weights include a control weight for a virtualizer; and
wherein the control weight for the virtualizer is calculated such that the coefficients of the virtualizer scale between pass through and full virtualization.

31. The method according to any one of EEEs 22 to 30,
wherein the control weights include a control weight for a dialogue enhancer; and
wherein the control weight for the dialogue enhancer is calculated such that dialogue enhancement by the dialogue enhancer is enhanced if the classification information indicates that the content type of the audio content is speech or likely to be speech.

32. The method according to any one of EEEs 22 to 31,
wherein the control weights include a control weight for a dynamic equalizer; and
wherein the control weight for the dynamic equalizer is calculated such that the dynamic equalizer is disabled if the classification information indicates that the content type of the audio content is speech or likely to be speech.

33. The method according to any one of EEEs 22 to 32, further comprising smoothing of the control weights.

34. The method according to EEE 33, wherein the smoothing of the control weights depends on the particular control weight that is smoothed.

35. The method according to EEE 33 or 34, wherein the smoothing of the control weights depends on a device type of a device that performs the decoding.

36. The method according to any one of EEEs 33 to 35, further comprising applying a non-linear mapping function to the control weights to increase continuity of the control weights.

37. A method of decoding audio content from a bitstream including two-channel audio content and classification information for the two-channel audio content, wherein the classification information is indicative of a content classification of the two-channel audio content, the method comprising:
receiving the AC-4 bitstream;
decoding the two-channel audio content and the classification information;
upmixing the two-channel audio content to upmixed 5.1-channel audio content;
applying a virtualizer to the upmixed 5.1-channel audio content for 5.1 virtualization for a two-channel speaker array;
applying a cross-fader to the two-channel audio content and the virtualized upmixed 5.1-channel audio content; and
routing an output of the cross-fader to the two-channel speaker array,
wherein the method further comprises calculating respective control weights for the virtualizer and the cross-fader based on the classification information.

38. A method of decoding audio content from a bitstream including two-channel audio content and classification information for the two-channel audio content, wherein the classification information is indicative of a content classification of the two-channel audio content, the method comprising:
receiving the bitstream;
decoding the two-channel audio content and the classification information;
applying an upmixer to the two-channel audio content for upmixing the two-channel audio content to upmixed 5.1-channel audio content;
applying a virtualizer to the upmixed 5.1-channel audio content for 5.1 virtualization for a five-channel speaker array; and
routing an output of the virtualizer to the five-channel speaker array,
wherein the method further comprises calculating respective control weights for the upmixer and the virtualizer based on the classification information.

39. An encoder for encoding audio content, the encoder comprising a processor coupled to a memory storing instructions for the processor, wherein the processor is adapted to perform the method according to any one of EEEs 1 to 19.

40. A decoder for decoding audio content, the decoder comprising a processor coupled to a memory storing instructions for the processor, wherein the processor is adapted to perform the method according to any one of EEEs 20 to 38.

41. A computer program including instructions for causing a processor that carries out the instructions to perform the method according to any one of EEEs 1 to 38.

42. A computer-readable storage medium storing the computer program according to EEE 41.

The invention claimed is:

1. A method of decoding audio content from a bitstream comprising:
receiving the bitstream from the encoder, the bitstream including audio content and classification information comprising confidence values, each confidence value being associated with a respective content type and giving an indication of a likelihood range that the audio content is of the respective content type, where the likelihood range of the confidence value includes at least one confidence value between zero likelihood and full likelihood;
decoding the audio content and the classification information;
performing a content analysis on the decoded audio content to determine one or more additional confidence values, where the additional confidence values are different than the confidence values included in the classification information;
selecting, based on the classification information and the one or more additional confidence values, a post processing mode for performing post processing of the decoded audio content; and
calculating control weights for the post processing of the decoded audio content based on the confidence values, and wherein at least one control weight is for a virtualizer that is calculated based on at least two confidence scores or additional confidence values.

2. The method according to claim 1, wherein the selecting of the post-processing mode is further based on a user input.

3. The method of claim 2, wherein the bitstream includes two-channel audio content and classification information for the two-channel audio content, wherein the classification information is indicative of a content classification of the two-channel audio content, the method comprising:
decoding the two-channel audio content and the classification information;
applying an upmixer to the two-channel audio content for upmixing the two-channel audio content to upmixed 5.1-channel audio content;
applying the virtualizer to the upmixed 5.1-channel audio content for 5.1 virtualization for a five-channel speaker array; and
routing an output of the virtualizer to the five-channel speaker array,
wherein the method further comprises calculating respective control weights for the upmixer and the virtualizer based on the classification information.

4. The method of claim 1, wherein the bitstream comprises channel-based audio content and the post processing comprises:

upmixing, by an upmixer, the channel-based audio content to an upmixed channel-based audio content; and applying the virtualizer to the upmixed channel-based audio content to obtain a virtualized upmixed channel-based audio content for virtualization for a speaker array of a desired number of channels.

5. The method according to claim 4, further comprising routing an output of the virtualizer to the speaker array, and calculating a control weight for the upmixer based on the classification information.

6. The method of claim 4, wherein, after applying the virtualizer, the method further comprises:

applying a cross fader to the channel-based audio content and the virtualized upmixed channel-based audio content;

routing an output of the cross-fader to the speaker array, and calculating respective control weights for the upmixer and the cross-fader based on the classification information.

7. The method of claim 1, wherein the control weights are for respective modules for post processing of the decoded audio content.

8. The method of claim 1, wherein the control weights include at least one control weight for an equalizer, the control weight for the virtualizer, at least one control weight for a surround processor, and at least one control weight for a dialogue enhancer.

9. The method of claim 1, wherein the calculation of the control weights depends on a device type of a device that performs the decoding.

10. The method of claim 1, wherein the calculation of the control weights is further based on a user input.

11. The method of claim 1, wherein the calculation of the control weights is further based on a number of channels of the audio content.

12. The method of claim 1,
wherein the control weight for the virtualizer is calculated such that the virtualizer is disabled if the classification information indicates that the content type of the audio content is music or likely to be music.

13. The method of claim 1,
wherein the control weight for the virtualizer is calculated such that the coefficients of the virtualizer scale between pass through and full virtualization.

14. The method of claim 1,
wherein the control weights include a control weight for a dialogue enhancer; and
wherein the control weight for the dialogue enhancer is calculated such that dialogue enhancement by the dialogue enhancer is enhanced if the classification information indicates that the content type of the audio content is speech or likely to be speech.

15. The method of claim 1,
wherein the control weights include a control weight for a dynamic equalizer; and
wherein the control weight for the dynamic equalizer is calculated such that the dynamic equalizer is disabled if the classification information indicates that the content type of the audio content is speech or likely to be speech.

16. The method according of claim 1, further comprising smoothing of the control weights.

17. The method of claim 16, wherein the smoothing of the control weights depends on the particular control weights that are smoothed.

* * * * *